United States Patent
Grajcar

(10) Patent No.: US 10,617,099 B2
(45) Date of Patent: Apr. 14, 2020

(54) LIGHT SOURCES ADAPTED TO SPECTRAL SENSITIVITY OF DIURNAL AVIANS AND HUMANS

(71) Applicant: SIGNIFY NORTH AMERICA CORPORATION, Somerset, NJ (US)

(72) Inventor: Zdenko Grajcar, Orono, MN (US)

(73) Assignee: SIGNIFY NORTH AMERICA CORPORATION, Somerset, NJ (US)

(*) Notice: Subject to any disclaimer, the term of this patent is extended or adjusted under 35 U.S.C. 154(b) by 399 days.

(21) Appl. No.: 15/337,022

(22) Filed: Oct. 28, 2016

(65) Prior Publication Data

US 2017/0105391 A1  Apr. 20, 2017

Related U.S. Application Data

(63) Continuation of application No. 14/672,773, filed on Mar. 30, 2015, now Pat. No. 9,482,397, which is a
(Continued)

(51) Int. Cl.
*F21V 9/02* (2018.01)
*A01K 45/00* (2006.01)
(Continued)

(52) U.S. Cl.
CPC ............... *A01K 45/00* (2013.01); *A01K 1/00* (2013.01); *A01K 29/00* (2013.01); *A01K 31/00* (2013.01);
(Continued)

(58) Field of Classification Search
CPC .......... A01K 1/00; A01K 29/00; A01K 31/00; A01K 31/22; A01K 45/00; F21S 8/006;
(Continued)

(56) References Cited

U.S. PATENT DOCUMENTS 4,239,020 A  12/1980  Kiyokawa et al.
4,271,788 A   6/1981  Knowles
(Continued)

FOREIGN PATENT DOCUMENTS

CH      662244 A5    9/1987
CN   101162847 A    4/2008
(Continued)

OTHER PUBLICATIONS

"CN Application Serial No. 2011/0022574.3, Fourth Office Action dated Apr. 18, 2016", 4 pgs.
(Continued)

*Primary Examiner* — Ali Alavi

(57) ABSTRACT

Various apparatus and associated methods involve a light source that provides light at wavelengths that substantially correlate to local maxima in the spectral sensitivity of a diurnal avian. In an illustrative example, the light source may output light primarily in wavelength bands that are not substantially absorbed by colored oil droplets and/or visual pigment in at least one type of cone in the eye of a diurnal avian. In some embodiments, the light source may include a light-emitting diode (LED) light source. Exemplary light sources may output spectral components to illuminate diurnal avians with local maxima of intensity at wavelengths that substantially correspond to local maxima in a spectral sensitivity visual response characteristic of the diurnal avians.

14 Claims, 15 Drawing Sheets

Related U.S. Application Data continuation-in-part of application No. 14/512,706, filed on Oct. 13, 2014, now Pat. No. 9,709,228, which is a continuation of application No. 14/070,686, filed on Nov. 4, 2013, now Pat. No. 8,858,005, which is a continuation of application No. 13/050,910, filed on Mar. 17, 2011, now Pat. No. 8,596,804.

(60) Provisional application No. 61/972,766, filed on Mar. 31, 2014, provisional application No. 61/314,617, filed on Mar. 17, 2010, provisional application No. 61/314,761, filed on Mar. 17, 2010.

(51) Int. Cl.
| | |
|---|---|
| *F21S 8/00* | (2006.01) |
| *A01K 1/00* | (2006.01) |
| *A01K 29/00* | (2006.01) |
| *A01K 31/22* | (2006.01) |
| *A01K 31/00* | (2006.01) |
| *F21W 131/40* | (2006.01) |
| *F21Y 115/10* | (2016.01) |
| *F21W 131/402* | (2006.01) |

(52) U.S. Cl.
CPC ............. *A01K 31/22* (2013.01); *F21S 8/006* (2013.01); *F21W 2131/40* (2013.01); *F21W 2131/402* (2013.01); *F21Y 2115/10* (2016.08)

(58) Field of Classification Search
CPC ......... F21W 2131/40; F21W 2131/402; F21Y 2115/10
USPC ............................................................ 362/2
See application file for complete search history.

(56) References Cited

U.S. PATENT DOCUMENTS

| | | | |
|---|---|---|---|
| 4,625,728 A | 12/1986 | Schonberg | |
| 4,700,887 A | 10/1987 | Timmons | |
| 4,721,062 A | 1/1988 | Williams et al. | |
| 4,872,421 A | 10/1989 | Laurent et al. | |
| 4,939,426 A | 7/1990 | Menard et al. | |
| 5,036,797 A | 8/1991 | Koozer | |
| 5,108,907 A | 4/1992 | Pleass | |
| 5,188,907 A | 2/1993 | Kawahara et al. | |
| 5,482,210 A | 1/1996 | Carey et al. | |
| 5,495,147 A | 2/1996 | Lanzisera | |
| 5,575,459 A | 11/1996 | Anderson | |
| 5,602,709 A | 2/1997 | Al-Dabbagh | |
| 5,900,929 A | 5/1999 | Hebrank et al. | |
| 6,116,190 A | 9/2000 | Kitt | |
| 6,166,496 A | 12/2000 | Lys et al. | |
| 6,224,243 B1 | 5/2001 | Karton | |
| 6,236,622 B1 | 5/2001 | Blackman | |
| 6,252,254 B1 | 6/2001 | Soules et al. | |
| 6,357,889 B1 | 3/2002 | Duggal et al. | |
| 6,461,019 B1 | 10/2002 | Allen | |
| 6,573,254 B1 | 6/2003 | Kuenzel et al. | |
| 6,636,003 B2 | 10/2003 | Rahm et al. | |
| 6,766,767 B2 | 7/2004 | El Halawani et al. | |
| 6,789,500 B2 | 9/2004 | Rozenboim | |
| 6,810,832 B2 | 11/2004 | Ford | |
| 6,933,707 B2 | 8/2005 | Allen | |
| 6,953,266 B1 | 10/2005 | Ver Hage et al. | |
| 7,038,399 B2 | 5/2006 | Lys et al. | |
| 7,081,722 B1 | 7/2006 | Huynh et al. | |
| 7,102,334 B2 | 9/2006 | Wiegand et al. | |
| 7,102,344 B1 | 9/2006 | Short | |
| 7,131,397 B2 | 11/2006 | El Halawani et al. | |
| 7,213,942 B2 | 5/2007 | Jiang et al. | |
| 7,220,018 B2 | 5/2007 | Crabb et al. | |
| 7,288,902 B1 | 10/2007 | Melanson | |
| 7,352,138 B2 | 4/2008 | Lys et al. | |
| 7,358,679 B2 | 4/2008 | Lys et al. | |
| 7,378,805 B2 | 5/2008 | Oh et al. | |
| 7,391,630 B2 | 6/2008 | Acatrinei | |
| 7,425,801 B2 | 9/2008 | Ozaki | |
| 7,436,134 B2 | 10/2008 | Levine | |
| 7,489,086 B2 | 2/2009 | Miaskin | |
| 7,709,774 B2 | 5/2010 | Schulz | |
| 7,723,926 B2 | 5/2010 | Mednik et al. | |
| D621,973 S | 8/2010 | Grajcar | |
| D621,974 S | 8/2010 | Grajcar | |
| 7,781,979 B2 | 8/2010 | Lys | |
| 7,791,289 B2 | 9/2010 | Oosterbaan et al. | |
| 7,847,486 B2 | 12/2010 | Ng | |
| 7,847,496 B2 | 12/2010 | Bui et al. | |
| 7,859,196 B2 | 12/2010 | Lee et al. | |
| 7,863,831 B2 | 1/2011 | Vos | |
| D632,837 S | 2/2011 | Grajcar | |
| 7,880,400 B2 | 2/2011 | Zhou et al. | |
| 7,902,769 B2 | 3/2011 | Shteynberg et al. | |
| 7,936,135 B2 | 5/2011 | Hum et al. | |
| D641,520 S | 7/2011 | Grajcar | |
| 7,977,892 B2 | 7/2011 | Lee et al. | |
| 8,102,167 B2 | 1/2012 | Irissou et al. | |
| 8,120,279 B2 | 2/2012 | Oosterbaan et al. | |
| 8,134,303 B2 | 3/2012 | Lys | |
| 8,159,125 B2 | 4/2012 | Miao | |
| 8,164,276 B2 | 4/2012 | Kuwabara | |
| 8,188,679 B2 | 5/2012 | Hoogzaad | |
| 8,188,687 B2 | 5/2012 | Lee et al. | |
| 8,205,577 B2 | 6/2012 | Sia et al. | |
| 8,324,642 B2 | 12/2012 | Grajcar | |
| 8,324,840 B2 | 12/2012 | Shteynberg et al. | |
| 8,373,363 B2 | 2/2013 | Grajcar | |
| 8,384,307 B2 | 2/2013 | Grajcar | |
| 8,468,976 B2 | 6/2013 | Kakimi et al. | |
| 8,471,483 B2 | 6/2013 | Lee et al. | |
| 8,531,136 B2 | 9/2013 | Grajcar | |
| 8,593,044 B2 | 11/2013 | Grajcar | |
| 8,596,804 B2* | 12/2013 | Grajcar .................... A01K 1/00 362/84 |
| 8,598,799 B2 | 12/2013 | Tai et al. | |
| 8,643,308 B2 | 2/2014 | Grajcar | |
| 8,657,463 B2 | 2/2014 | Lichten et al. | |
| D701,497 S | 3/2014 | Grajcar | |
| 8,736,194 B2 | 5/2014 | Kawai et al. | |
| 8,773,031 B2 | 7/2014 | Sadwick et al. | |
| 8,796,955 B2 | 8/2014 | Grajcar | |
| 8,858,005 B2* | 10/2014 | Grajcar .................... A01K 1/00 362/84 |
| 8,876,313 B2 | 11/2014 | Grajcar | |
| D719,684 S | 12/2014 | Grajcar | |
| 8,907,576 B2 | 12/2014 | Ferrier | |
| 8,922,136 B2 | 12/2014 | Grajcar | |
| 9,155,151 B2 | 10/2015 | Angeles | |
| 9,210,755 B2 | 12/2015 | Grajcar et al. | |
| 9,247,603 B2 | 1/2016 | Grajcar et al. | |
| 9,374,858 B2 | 6/2016 | Ni | |
| 9,433,046 B2 | 8/2016 | Grajcar | |
| 9,482,397 B2* | 11/2016 | Grajcar .................... F21S 8/006 |
| 9,700,019 B2 | 7/2017 | Grajcar et al. | |
| 9,709,228 B2* | 7/2017 | Grajcar .................... A01K 1/00 |
| 9,756,837 B2 | 9/2017 | Grajcar | |
| 9,844,210 B2 | 12/2017 | Grajcar et al. | |
| 2002/0003233 A1 | 1/2002 | Mueller-Mach et al. | |
| 2002/0047606 A1 | 4/2002 | Guthrie et al. | |
| 2002/0097007 A1 | 7/2002 | Koncz et al. | |
| 2002/0149929 A1 | 10/2002 | Evans et al. | |
| 2003/0164809 A1 | 9/2003 | Leung | |
| 2003/0172878 A1 | 9/2003 | Halawani et al. | |
| 2005/0212458 A1 | 9/2005 | Powers et al. | |
| 2005/0241593 A1* | 11/2005 | Kaura .................. A01K 1/0035 119/496 |
| 2005/0256554 A1* | 11/2005 | Malak .................. A61N 5/0616 607/88 |
| 2005/0276720 A1 | 12/2005 | Correa | |
| 2005/0280964 A1 | 12/2005 | Richmond et al. | |
| 2007/0086912 A1* | 4/2007 | Dowling .................. A01M 1/04 422/1 |
| 2007/0182338 A1 | 8/2007 | Shteynberg et al. | |

(56) References Cited

U.S. PATENT DOCUMENTS

| | | |
|---|---|---|
| 2007/0258240 A1 | 11/2007 | Ducharme et al. |
| 2008/0012722 A1 | 1/2008 | Moseley et al. |
| 2008/0017120 A1 | 1/2008 | Hawk |
| 2008/0042588 A1 | 2/2008 | Chan et al. |
| 2008/0116816 A1 | 5/2008 | Neuman et al. |
| 2008/0174233 A1 | 7/2008 | Bawendi et al. |
| 2008/0178819 A1 | 7/2008 | Sia et al. |
| 2008/0198009 A1 | 8/2008 | Hoeben et al. |
| 2008/0202443 A1 | 8/2008 | Potter |
| 2008/0203936 A1 | 8/2008 | Mariyama et al. |
| 2008/0211421 A1 | 9/2008 | Lee et al. |
| 2008/0218995 A1 | 9/2008 | Gilkey et al. |
| 2009/0096739 A1 | 4/2009 | Lan et al. |
| 2009/0160370 A1 | 6/2009 | Tai et al. |
| 2009/0185373 A1 | 7/2009 | Grajcar |
| 2009/0262515 A1 | 10/2009 | Lee et al. |
| 2009/0267534 A1 | 10/2009 | Godbole et al. |
| 2010/0013402 A1 | 1/2010 | Chaffai et al. |
| 2010/0060175 A1 | 3/2010 | Lethellier |
| 2010/0072903 A1 | 3/2010 | Blaut et al. |
| 2010/0164579 A1 | 7/2010 | Acatrinei |
| 2010/0165677 A1 | 7/2010 | Wang et al. |
| 2010/0225241 A1 | 9/2010 | Maehara et al. |
| 2010/0237800 A1 | 9/2010 | Kang et al. |
| 2010/0294205 A1 | 11/2010 | Kakimi et al. |
| 2010/0308739 A1 | 12/2010 | Shteynberg et al. |
| 2010/0308751 A1 | 12/2010 | Nerone |
| 2010/0310552 A1 | 12/2010 | Rapp et al. |
| 2010/0315012 A1 | 12/2010 | Kim et al. |
| 2011/0018465 A1 | 1/2011 | Ashdown |
| 2011/0031888 A1 | 2/2011 | Datta et al. |
| 2011/0031890 A1 | 2/2011 | Stack et al. |
| 2011/0037415 A1 | 2/2011 | Juestel et al. |
| 2011/0084619 A1 | 4/2011 | Gray |
| 2011/0088314 A1 | 4/2011 | Jacobs |
| 2011/0101883 A1 | 5/2011 | Grajcar |
| 2011/0109244 A1 | 5/2011 | Grajcar |
| 2011/0163680 A1 | 7/2011 | Welten |
| 2011/0183368 A1 | 7/2011 | Chapman et al. |
| 2011/0210678 A1 | 9/2011 | Grajcar |
| 2011/0227490 A1 | 9/2011 | Huynh |
| 2011/0228515 A1 | 9/2011 | Grajcar |
| 2011/0273103 A1 | 11/2011 | Hong |
| 2012/0001558 A1 | 1/2012 | Vos |
| 2012/0002408 A1 | 1/2012 | Lichten et al. |
| 2012/0025709 A1 | 2/2012 | Zampini et al. |
| 2012/0044713 A1 | 2/2012 | Chiang et al. |
| 2012/0081009 A1 | 4/2012 | Shteynberg et al. |
| 2012/0081018 A1 | 4/2012 | Shteynberg et al. |
| 2012/0104977 A1 | 5/2012 | Mckenzie et al. |
| 2012/0153833 A1 | 6/2012 | Mikani et al. |
| 2012/0186524 A1 | 7/2012 | Grajcar |
| 2012/0200229 A1 | 8/2012 | Kunst et al. |
| 2012/0223649 A1 | 9/2012 | Saes et al. |
| 2012/0268918 A1 | 10/2012 | Grajcar |
| 2012/0299500 A1 | 11/2012 | Sadwick et al. |
| 2013/0016506 A1 | 1/2013 | Odom, Jr. |
| 2013/0069536 A1 | 3/2013 | Ni |
| 2013/0069546 A1 | 3/2013 | Lin et al. |
| 2013/0127356 A1 | 5/2013 | Tanaka et al. |
| 2013/0134888 A1 | 5/2013 | Grajcar |
| 2013/0153938 A1 | 6/2013 | Grajcar |
| 2013/0157394 A1 | 6/2013 | Gr |
| 2013/0169159 A1 | 7/2013 | Lys |
| 2013/0187572 A1 | 7/2013 | Grajcar |
| 2013/0193864 A1 | 8/2013 | Angeles |
| 2013/0200812 A1 | 8/2013 | Radermacher et al. |
| 2013/0207555 A1 | 8/2013 | Qiu et al. |
| 2013/0234622 A1 | 9/2013 | Tanaka et al. |
| 2013/0342120 A1 | 12/2013 | Creusen et al. |
| 2014/0098531 A1 | 4/2014 | Grajcar |
| 2014/0103823 A1 | 4/2014 | Kahlman et al. |
| 2014/0111091 A1 | 4/2014 | Grajcar et al. |
| 2014/0126174 A1 | 5/2014 | Grajcar |
| 2014/0159584 A1 | 6/2014 | Grajcar |
| 2014/0159615 A1 | 6/2014 | Grajcar |
| 2014/0197741 A1 | 7/2014 | Sakai et al. |
| 2014/0197751 A1 | 7/2014 | Grajcar |
| 2014/0210352 A1 | 7/2014 | Grajcar |
| 2014/0210357 A1 | 7/2014 | Yan et al. |
| 2014/0252340 A1 | 9/2014 | Wang |
| 2015/0061534 A1 | 3/2015 | Grajcar |
| 2015/0069932 A1 | 3/2015 | Grajcar |
| 2015/0115845 A1 | 4/2015 | Grajcar |
| 2015/0136037 A1 | 5/2015 | Boonekamp et al. |
| 2015/0204497 A1 | 7/2015 | Grajcar |
| 2015/0230309 A1 | 8/2015 | Grajcar et al. |
| 2015/0237696 A1 | 8/2015 | Shackle |
| 2015/0247631 A1 | 9/2015 | Grajcar et al. |
| 2015/0273235 A1 | 10/2015 | Grajcar |
| 2016/0113079 A1 | 4/2016 | Hiramatu et al. |
| 2016/0165698 A1 | 6/2016 | Grajcar |
| 2016/0212817 A1 | 7/2016 | Grajcar et al. |
| 2016/0242448 A1 | 8/2016 | Ludescher et al. |
| 2016/0316727 A1 | 11/2016 | Grajcar et al. |
| 2016/0323960 A1 | 11/2016 | Grajcar |
| 2017/0000163 A1 | 1/2017 | Grajcar |
| 2017/0064781 A1 | 3/2017 | Haskvitz |
| 2017/0273281 A1 | 9/2017 | Grajcar et al. |
| 2017/0290124 A1 | 10/2017 | Grajcar |

FOREIGN PATENT DOCUMENTS

| | | |
|---|---|---|
| CN | 102612791 A | 7/2012 |
| CN | 101672839 B | 11/2012 |
| CN | 104106122 A | 10/2014 |
| CN | 205694943 U | 11/2016 |
| EP | 0064175 A1 | 11/1982 |
| EP | 0229583 A2 | 7/1987 |
| EP | 1502483 A1 | 2/2005 |
| EP | 2094063 A1 | 8/2009 |
| EP | 2465174 A1 | 2/2011 |
| EP | 2465329 A1 | 7/2012 |
| EP | 2666220 A2 | 7/2012 |
| EP | 2795654 A1 | 10/2014 |
| GB | 2522020 A | 7/2015 |
| JP | 05199823 | 8/1993 |
| JP | H05199823 A | 8/1993 |
| JP | 2004248333 A | 9/2004 |
| JP | 2005137238 A | 6/2005 |
| JP | 2006147933 A | 6/2006 |
| JP | 2006244848 A | 9/2006 |
| JP | 2007511903 A | 5/2007 |
| JP | 2007299788 A | 11/2007 |
| JP | 2008059811 A | 3/2008 |
| JP | 2008218043 A | 9/2008 |
| JP | 2009026544 A | 2/2009 |
| JP | 2009035673 A | 2/2009 |
| JP | 2009060069 A | 3/2009 |
| JP | 2009117036 A | 5/2009 |
| JP | 2009123427 A | 6/2009 |
| JP | 2009171866 A | 6/2009 |
| JP | 2011040701 A | 2/2011 |
| JP | 2014516452 A | 7/2014 |
| JP | 5676611 B2 | 1/2015 |
| KR | 20120112146 A | 10/2012 |
| WO | WO-1984000693 A1 | 3/1984 |
| WO | WO-9950916 A1 | 10/1999 |
| WO | WO-0033389 A1 | 6/2000 |
| WO | WO-0056330 A1 | 9/2000 |
| WO | WO-2001006630 A1 | 1/2001 |
| WO | WO-2002061427 A1 | 8/2002 |
| WO | WO-2005084080 A2 | 9/2005 |
| WO | WO-2008114250 | 9/2008 |
| WO | WO-2010037009 A1 | 4/2010 |
| WO | WO-2012100183 A2 | 7/2012 |
| WO | WO-2013044916 A1 | 4/2013 |
| WO | WO-2013090505 A1 | 6/2013 |
| WO | WO-2013100736 A1 | 7/2013 |
| WO | WO-2013169159 A1 | 11/2013 |
| WO | WO-2014047473 A1 | 3/2014 |
| WO | WO-2014052897 A1 | 4/2014 |
| WO | WO-2014200960 A1 | 12/2014 |
| WO | WO-2015002665 A1 | 1/2015 |

(56) References Cited

FOREIGN PATENT DOCUMENTS

| WO | WO-2015017655 A1 | 2/2015 |
|---|---|---|
| WO | WO-2015038720 A1 | 3/2015 |
| WO | WO-2015105776 A1 | 7/2015 |
| WO | WO-2015105823 A1 | 7/2015 |
| WO | WO-2015113818 A1 | 8/2015 |
| WO | WO-2016033002 A1 | 3/2016 |
| WO | WO-2017004318 A1 | 1/2017 |
| WO | WO-2017172869 A1 | 10/2017 |
| WO | WO-2018175561 A1 | 9/2018 |

OTHER PUBLICATIONS

"CN Application Serial No. 2011/80022574.3, Third Office Action dated Aug. 27, 2015.", 8 pgs.
"CN Application Serial No. 2011/80022574.3 Second Office Action dated Feb. 9, 2015", 7 pgs.
"CN Application Serial No. 2011/80022574.3, First Office Action dated Jul. 2, 2014", 5 pgs.
"EP Application Serial No. 1175037.4, European Search Report dated Nov. 24, 2017", 9 pgs.
Kennedy, Donald, et al., "Selective Light Absorption by the Lenses of Lower Vertebrates, and its Influence O N Spectral Sensitivity", The Biological Laboratories, Harvard University; Marine Biological Laboratory; and U. S. Fish and Wildlife Service Laboratory, Woods Hole, Mass., (1956), 12 pgs.
Yuhua, Xue, "Illumination and Benefit of Chicken Raising", New Countryside 2009 No. 3—No English Translation w/ Concise Statement of Relevance Under 37 CFR 1.98(a)(3)(i) For Citation of Non-English Language Document(s) from Related/Counterpart Foreign Application, (Mar. 31, 2009), 3 pgs.
"U.S. Appl. No. 13/050,910, Notice of Allowance dated Jul. 30, 2013", 15 pgs.
"U.S. Appl. No. 13/050,910, Office Action dated Feb. 5, 2013", 10 pgs.
"U.S. Appl. No. 13/050,910, Response filed May 22, 2013 to Office Action dated Feb. 5, 2013", 7 pgs.
"U.S. Appl. No. 14/070,686, Amendment After Notice of Allowance filed Sep. 11, 2014", 3 pgs.
"U.S. Appl. No. 14/070,686, Notice of Allowance dated Jun. 24, 2014", 9 pgs.
"U.S. Appl. No. 14/070,686, Preliminary Amendment filed Jan. 17, 2014", 37 pgs.
"U.S. Appl. No. 14/070,686, USPTO Response dated Sep. 17, 2014 to Amendment After Notice of Allowance filed Sep. 11, 2014", 2 pgs.
"U.S. Appl. No. 14/672,773, Notice of Allowance dated Apr. 26, 2016", 9 pgs.
"U.S. Appl. No. 14/672,773, Notice of Allowance dated Jun. 29, 2016", 9 pgs.
"International Application Serial No. PCT/US2001/028910, International Preliminary Report on Patentability dated Sep. 27, 2012", 6 pgs.
"International Application Serial No. PCT/US2001/028910, International Search Report dated May 26, 2011", 1 pgs.
"Selective Light Absorption by the lenses of lower vertebrates, and its influence on spectral sensitivity", The Biological Bullentin 11:375-386, (Dec. 1956), 375-386.
Dartnall, H. J.A, et al., "Human Visual Pigments: Microspectrophotometric Results from the Eyes of Seven Persons", Proceedings of the Royal Society of London. Series B, Biological Sciences 220(1218), (Nov. 22, 1983), 115-130.
Davis, N. J, et al., "Preferences of Growing Fowls for Different Light Intensities in Relation to Age, Strain and Behaviour", Animal Welfare 8(3), (199), 193-203, (1999).
Halevy, O., et al., "Muscle development—Could environmental manipulations during embryogenesis of broilers change it?", EPC 2006—12th European Poultry Conference, (Sep. 2006), 7 pgs.

Rahimi, G., et al., "The Effect of Intermittent Lighting Schedule on Broiler Performance", International Journal of Poultry Science, 4(6), (2005), 396-398.
Rozenboim, I., et al., "The effect of a green and blue monochromatic light combination on broiler growth and development", Poultry Science, 83(5), (2004), 842-845.
Rozenboim, I., et al., "The Effect of Monochromatic Light on Broiler Growth and Development", Poultry Science, 78(1), (1999), 135-138.
"U.S. Appl. No. 13/355,182, Non Final Office Action dated Oct. 10, 2014", 16 pgs.
"U.S. Appl. No. 13/676,358, Non Final Office Action filed Mar. 12, 2015", 33 pgs.
"U.S. Appl. No. 14/033,252, Notice of Allowance dated Mar. 31, 2014", 10 pgs.
"U.S. Appl. No. 14/033,252, Notice of Allowance dated Jul. 9, 2014", 10 pgs.
"U.S. Appl. No. 14/144,298, Non Final Office Action dated Sep. 22, 2014", 8 pgs.
"U.S. Appl. No. 14/160,721, Final Office Action dated Jan. 28, 2015", 11 pgs.
"U.S. Appl. No. 14/160,721, Non Final Office Action dated Aug. 15, 2014", 14 pgs.
"U.S. Appl. No. 14/170,760, Non Final Office Action dated Oct. 3, 2014", 18 pgs.
"U.S. Appl. No. 14/514,612, Non Final Office Action dated Apr. 8, 2015", 6 pgs.
"U.S. Appl. No. 14/619,163, Notice of Allowance dated Sep. 23, 2015", 9 pgs.
"U.S. Appl. No. 15/005,104, Final Office Action dated Jan. 20, 2017", 7 pgs.
"U.S. Appl. No. 15/005,104, Non Final Office Action dated May 27, 2016", 5 pgs.
"U.S. Appl. No. 15/005,104, Notice of Allowance dated Jan. 22, 2018", 5 pgs.
"U.S. Appl. No. 15/005,104, Notice of Allowance dated May 18, 2018", 5 pgs.
"U.S. Appl. No. 15/005,104, Notice of Allowance dated Aug. 21, 2017", 7 pgs.
"U.S. Appl. No. 15/005,104, Response filed Jul. 19, 2017 to Final Office Action dated Jan. 20, 2017", 5 pgs.
"U.S. Appl. No. 15/005,104, Response filed Oct. 26, 2016 to Non Final Office Action dated May 27, 2016", 5 pgs.
"U.S. Appl. No. 15/108,705, Final Office Action dated Oct. 4, 2018", 11 pgs.
"U.S. Appl. No. 15/108,705, Non Final Office Action dated Jan. 6, 2017", 11 pgs.
"U.S. Appl. No. 15/108,705, Non Final Office Action dated Jan. 19, 2018", 10 pgs.
"U.S. Appl. No. 15/108,705, Response filed Jun. 19, 2018 to Non Final Office Action dated Jan. 19, 2018", 8 pgs.
"U.S. Appl. No. 15/108,705, Response filed Jul. 6, 2017 to Non Final Office Action dated Jan. 6, 2017", 8 pgs.
"U.S. Appl. No. 15/198,096, Response fled Feb. 11, 2019 to Restriction Requirement dated Nov. 13, 2018", 5 pgs.
"U.S. Appl. No. 15/198,096, Restriction Requirement dated Nov. 13, 2018", 5 pgs.
"U.S. Appl. No. 15/735,446 EP Search Report dated Jul. 26, 2017", 9 pgs.
"Application Serial No. PCT/US2016/040286, Invitation to Pay Add'l Fees and Partial Search Report dated Aug. 31, 2016", 2 pgs.
"Chinese Application Serial No. 2010800467911, Office Actioni dated Feb. 10, 2014", W/ English Translation, 6 pgs.
"Chinese Application Serial No. 2010800467911, Office Action dated Sep. 3, 2014", W/ English Translation, 2 pgs.
"Chinese Application Serial No. 201080046880.6, Office Action dated Jan. 24, 2014", W/ English Translation, 7 pgs.
"CN Application Serial No. 2013/800786639 Global Dossier Translation of First Office Action dated Mar. 3, 2017", 7 pgs.
"CN Application Serial No. 2013/800786639 Global Dossier Translation of Second Office Action dated Nov. 1, 2017", 7 pgs.
"CN Application Serial No. 2014/800610231 Global Dossier Translation of First Office Action dated Mar. 28, 2017", 5 pgs.

(56) References Cited

OTHER PUBLICATIONS

"Dali Leading and Trailing—Edge Phase Dimmers", PCD 300, Lux Control spec, Dec. 11, 2006, retrieved Dec. 20, 2010. http://www.tridonic.com/com/en/downloads/DS-DALI-PCD-300-one4all)en.pdf, 2 pgs.
"Dali PCDE 300 one4all Leading-edge/trailing-edge dimmer", Tridonic, (Accessed on Mar. 8, 2013), 2 pgs.
"European Application No. EP10827580.1 Extended European_Search_Report_dated Feb. 5, 2016", (Feb. 5, 2016), 6 pgs.
"European Application No. EP11757037.4 European_Search_Report_dated Nov. 24, 2017", (dated Nov. 24, 2017), 9 pgs.
"European Application No. EP12739301.5 European_Search_Report_dated Nov. 24, 2017", (dated Nov. 24, 2017), 10 pgs.
"European Application No. EP13838707.1 European Search Report dated Jun. 10, 2016", (dated Jun. 10, 2016), 11 pgs.
"European Application No. EP15735446.5 European_Search_Report_dated Jul. 26, 2017", (dated Jul. 26, 2017), 9 pgs.
"European Application Serial No. EP14843579.5 European Search Report dated Apr. 28, 2017", (dated Apr. 28, 2017), 5 pgs.
"European Application Serial No. 14/843579.5 search report dated Apr. 28, 2017", 5 pgs.
"European Application Serial No. 15734927.5, search report dated May 9, 2017", (dated May 9, 2017), 8 pgs.
"Hazard of Harmonics and Neutral Overloads", American Power Conversion Legendary Reliability: White Paper#26, (2003), 8 pgs.
"International Application Serial No. PCT/US2010/045467, International Preliminary Report on Patentability dated Feb. 14, 2012", 7 pgs.
"International Application Serial No. PCT/US2010/045467, International Search Report dated Oct. 7, 2010", (dated Oct. 7, 2010), 2 pgs.
"International Application Serial No. PCT/US2010/045467, Written Opinion dated Oct. 7, 2010", (dated Oct. 7, 2010), 6 pgs.
"International Application Serial No. PCT/US2010/054506, International Preliminary Report on Patentability dated May 1, 2012", 7 pgs.
"International Application Serial No. PCT/US2010/054506, International Search Report dated Dec. 28, 2010", (dated Dec. 28, 2010), 2 pgs.
"International Application Serial No. PCT/US2010/054506, Written Opinion dated Dec. 28, 2010", (dated Dec. 28, 2010), 6 pgs.
"International Application Serial No. PCT/US2010/054869, International Search Report dated Jan. 12, 2011", (dated Jan. 12, 2011), 2 pgs.
"International Application Serial No. PCT/US2010/054869, International Search Report dated May 5, 2011", (dated May 5, 2011), 2 pgs.
"International Application Serial No. PCT/US2010/054869, International Written Opinion dated Jan. 12, 2011", (dated Jan. 12, 2011), 4 pgs.
"International Application Serial No. PCT/US2010/054869, Written Opinion dated Apr. 29, 2012", (dated Apr. 29, 2012), 4 pgs.
"International Application Serial No. PCT/US2011/028910, International Preliminary Report on Patentability dated Sep. 18, 2012", 5 pgs.
"International Application Serial No. PCT/US2011/028910, International Search Report dated May 26, 2011", 2 pgs.
"International Application Serial No. PCT/US2011/028910, International Search Report dated May 26, 2011", (dated May 26, 2011), 2 pgs.
"International Application Serial No. PCT/US2011/028910, Written Opinion dated May 26, 2011", (dated May 26, 2011), 4 pgs.
"International Application Serial No. PCT/US2012/022059, International Preliminary Report on Patentability dated Mar. 25, 2014", 8 pgs.
"International Application Serial No. PCT/US2012/022370, International Search Report dated May 25, 2012", (dated May 25, 2018), 2 pgs.
"International Application Serial No. PCT/US2012/022370, Written Opinion dated May 25, 2012", (dated May 25, 2012), 5 pgs.
"International Application Serial No. PCT/US2013/060983, International Preliminary Report on Patentability dated Apr. 2, 2015", 8 pgs.
"International Application Serial No. PCT/US2013/060983, International Search Report dated Jan. 2, 2014", (dated Jan. 2, 2014), 3 pgs.
"International Application Serial No. PCT/US2013/060983, Written Opinion dated Jan. 2, 2014", (dated Jan. 2, 2014), 6 pgs.
"International Application Serial No. PCT/US2013/078368 International Search Report dated Mar. 27, 2014", (dated Mar. 27, 2014), 3 pgs.
"International Application Serial No. PCT/US2013/078368, International Preliminary Report on Patentability dated Jan. 14, 2016", (dated Jan. 14, 2016), 8 pgs.
"International Application Serial No. PCT/US2013/078368, Written Opinion dated Mar. 27, 2014", (dated Mar. 27, 2014), 6 pgs.
"International Application Serial No. PCT/US2014/049143, International Search Report dated Nov. 6, 2014", (dated Nov. 6, 2014), 2 pgs.
"International Application Serial No. PCT/US2014/049143, Written Opinion dated Nov. 6, 2014", 4 pgs.
"International Application Serial No. PCT/US2014/055106, International Preliminary Report on Patentabililty dated Mar. 24, 2016", (dated Mar. 24, 2016), 4 pgs.
"International Application Serial No. PCT/US2014/055106, International Search Report dated Dec. 18, 2014", (dated Dec. 18, 2014), 2 pgs.
"International Application Serial No. PCT/US2014/055106, Written Opinion dated Dec. 18, 2014", (dated Dec. 18, 2014), 3 pgs.
"International Application Serial No. PCT/US2015/010268, International Preliminary Report on Patentability dated Jul. 21, 2016", (dated Jul. 21, 2016), 6 pgs.
"International Application Serial No. PCT/US2015/010268, International Search Report dated May 1, 2015", (dated May 1, 2015), 2 pgs.
"International Application Serial No. PCT/US2015/010268, Written Opinion dated May 1, 2015", (dated May 1, 2015), 4 pgs.
"International Application Serial No. PCT/US2015/010407, International Search Report dated Apr. 7, 2015", (dated Apr. 7, 2015), 2 pgs.
"International Application Serial No. PCT/US2015/010407, Written Opinion dated Apr. 7, 2015", (dated Apr. 7, 2015), 4 pgs.
"International Application Serial No. PCT/US2015/046641, Search Report Written Opinion dated Nov. 24, 2015.", (dated Nov. 24, 2015), 8 pgs.
"International Application Serial No. PCT/US2016/040286, International Preliminary Report on Patentability dated Jan. 11, 2018", 8 pgs.
"International Application Serial No. PCT/US2016/040286, International Search Report dated Oct. 28, 2016", (dated Oct. 28, 2016), 4 pgs.
"International Application Serial No. PCT/US2016/040286, Written Opinion dated Oct. 28, 2016", (dated Oct. 28, 2016), 6 pgs.
"International Application Serial No. PCT/US2016/049433, International Preliminary Report on Patentability dated Mar. 6, 2018", (dated Mar. 16, 2018), 7 pgs.
"International Application Serial No. PCT/US2016/049433, International Search Report dated Nov. 15, 2016", (dated Nov. 15, 2018), 2 pgs.
"International Application Serial No. PCT/US2016/049433, Written Opinion dated Nov. 15, 2016", (dated Nov. 15, 2016), 6 pgs.
"International Application Serial No. PCT/US2017/024679, International Search Report dated Aug. 2, 2017", (dated Aug. 2, 2017), 4 pgs.
"International Application Serial No. PCT/US2017/024679, Invitation to Pay Additional Fees and Partial Search Report dated Jun. 7, 2017", (dated Jun. 7, 2012), 2 pgs.
"International Application Serial No. PCT/US2017/024679, Written Opinion dated Aug. 2, 2017", (dated Aug. 2, 2017), 5 pgs.
"International Application Serial No. PCT/US2018/023535, International Search Report dated May 24, 2018", (dated May 24, 2018), 3 pgs.

(56) References Cited

OTHER PUBLICATIONS

"International Application Serial No. PCT/US2018/023535, Written Opinion dated May 24, 2018", (dated May 24, 2018), 7 pgs.
"Japanese Application Serial No. 2012-524899, Office Action filed Feb. 24, 2014", W/ English Translation, 6 pgs.
"Japanese Application Serial No. 2012-524901, Office Action filed Mar. 26, 2015", W/ English Translation, 6 pgs.
"Lighting for Layers", TAS Issue May 17, 2005, Technical Advice Sheet, (c) British United Turkeys Limited, (2005), 3 pgs.
"Natura 60", Big Dutchman The modern aviary fo bard and free range egg production, (Apr. 2010), 3 pgs.
"Natura 70", Big Dutchman The modern aviary for bard and free range egg production, (Dec. 2010), 3 pgs.
"Sequential Linear LED Driver", Supertex inc.: DOC.#DSFP-CL8800, (2014), 7 pgs.
"TPS92411xFloating Switch for Offline AC Linear Direct Drive of LEDs with Low Ripple Current", Texas Instruments: SLUSBQ6B, (Oct. 2013), 29 pgs.
Bowmaker, James K, et al., "Evolution of vertebrate visual pigments", Current Biology vol. 16 No. 13 R484, 6 pgs.
Bruininx, E.M A. M., et al., "A prolonged photoperiod improves feed intake and energy metabolism of weanling pigs", Journal of Animal Science 80, (2002), 1736-1745
Cao, J., et al., "Green and Blue Monochromatic Lights Promote Growth and Development of Broilers Via Stimulating Testosterone Secretion and Myofiber Growth", J. Appl. Poult. Res., 17(2), (2008), 211-218.
Carroll, Joseph, et al., "Photopigment basis for dichromatic color vision in the horse", Journal of Vision 1, (2001), 80-87.
Chiao, Chuan-Chin, et al., "Spectral tuning of dichromats to natural scenes", Vision Research 40, (2000), 3257-3271.
Clarke, S, et al., "Energy Efficient Swine Lighting", Ontario Ministry of Agriculture Food and Rural Affairs, (Jan. 2006), 8 pgs.
Claus, R, et al., "Influence of lightand photoperiodicity on pig prolifcacy", J Reprod. Fert., Supple 33, (1985), 185-197.
Deaton, JW, et al., "Effect of Intermittent Light on Broilers Reared under Moderate Temperature Conditions", Poultry Science, vol. 57, No. 3, (May 1, 1978), 785-788.
El Halawani, M. E., et al., "Light Intensity Requirement for Breeder Hen Turkeys", Minnesota Turkey Gobbles, 66(4), (Jun. 2009), 3 pgs.
El Halawani, M. E., "Light spectrum and breederhen turkeys egg production", Proceedings of the "Midwest Poultry Federation Convention", St. Paul., MN, (Oct. 2, 2007), 2 pgs.
Er, D., et al., "Effect of Monochromatic Light on the Egg Quality of Laying Hens", J. Appl. Poult. Res., 16(4), (2007), 605-612.
Gustafsson, G, et al., "Laying hens reactions on artificial light in a floor housing system", Agric Eng Int: CIGR Journal vol. 12, No. 2, (Jun. 2010), 21-30.
Ham, A. D., et al., "Colour preferences and colour vision in poultry chicks", Proc. R. Soc. B, 274(1621), (2007), 1941-1948.
Jacobs, Gerald H, "Evolution of colourvision in mammals", Philosophical Transactions of the Royal Society 364, (2009), 2957-2967.
Jacobs, Gerald H, et al., "Photopigment basis for dichromatic color vision in cows, goats, and sheep", Visual Neuroscience 15, (1998), 581-584.
Kuhlmann, Josef, "Aviary System Layer Aviary", Farmer Automatic GmbH & CoKG, 4 pgs.
Kuhlmann, Josef, "Combi System Combi Layer System", Farmer Automatic GmbH & CoKG, 4 pgs.
Kuhlmann, Josef, "Floor System Layer Floor System", Farmer Automatic GmbH & CoKG, 4 pgs.
Kuhlmann, Josef, "Multi Deck System Layer Cage", Farmer Automatic GmbH & CoKG, 4 pgs.
Manci, William E, et al., "Design and Performance of an Electronic Lighting-Control Circuit That Simulates Sunrise and Sunset", The Progressive Fish-Culturist 54, (1992), 127-129.
Minh, Tran Hoang Quang, et al., "Novel lighting properties of white LEDs with two-layered remote phosphor package using red-emitting a-SrO3B2O3:Sm2+ phosphor", Materials Science-Poland, 35(3), (2017), 618-625.
Neitz, Jay, et al., "Spectral sensitivity of cones in an ungulate", Visual Neuroscience 2, (1989), 97-100.
Olanrewaju, H. A., et al., "A Review of Lighting Programs for Broiler Production", International Journal of Poultry Science, 5(4), (2006), 301-308.
Prayitno, D. S., et al., "The Effects of Color and Lighting on the Behavior and Production of Meat Chickens", Poultry Science, 7693), (1997), 452-457.
Prescott, N. B., et al., "Spectral sensitivity of the domestic fowl (*Gallusg. domesticus*)", British Poultry Science, 40(3), (1999), 332-339.
Rozenboim, I., et al., "New Monochromatic Light Source for Laying Hens", Poultry Science, 77(11), (1998), 1695-1698.
Taylor, Nina, "Lighting for Pig Units", Report compiled for BPEX, [Online]. Retrieved from the Internet: <http://www.bpex.org.uk/media/39814/lighting-for-pig-units-final-report.pdf>, (Apr. 30, 2010), 1-74.
Taylor, Todd, "Great Green Hope: The Corporate Love Affair Wth Algae", Biomass Magazine, (Apr. 2010), 2 pgs.
Wilson, M., et al., "Impact of Lighting Programs on Broiler Performance", Technical Focus, vol. 1, No. 1, (c) 2011 COBB South Affrica, (2011), 4 pgs.
Woodard, A E, et al., "Effect of Wave Length of Light on Growth and reproduction in Japanese Quail", Oxford Journals.org, (Jun. 4, 1968), 6 pgs.
"U.S. Appl. No. 15/198,096, Non Final Office Action dated Mar. 20, 2019", 10 pgs.
"European Application No. EP16818752.4 European Search Report dated Oct. 16, 2018", (dated Oct. 16, 2018), 8 pgs.
U.S. Appl. No. 15/108,705, filed Jun. 28, 2016, DC LED Agricultural Lighting Assembly.
U.S. Appl. No. 15/198,096, filed Jun. 30, 2016, Method of Increasing Feed Intake of an Animal.

\* cited by examiner

LIGHT SOURCES ADAPTED TO SPECTRAL SENSITIVITY OF DIURNAL AVIANS AND HUMANS

CROSS-REFERENCE TO RELATED APPLICATIONS

This application claims priority to and the benefit of U.S. Provisional Patent Application Ser. No. 61/972,766 filed Mar. 31, 2014, entitled "System and Method of Reducing Bacteria Within an Agricultural Facility" and is a continuation-in-part of U.S. patent application Ser. No. 14/512,706 filed Oct. 13, 2014, entitled "Light Sources Adapted to the Spectral Sensitivity of Diurnal Avians", which application is a continuation of U.S. patent application Ser. No. 14/070,686 entitled "Light Sources Adapted to the Spectral Sensitivity of Diurnal Avians" filed Nov. 4, 2013, now U.S. Pat. No. 8,858,005, which application is a continuation U.S. patent application Ser. No. 13/050,910, filed Mar. 17, 2011, now U.S. Pat. No. 8,596,804 entitled "Light Sources Adapted to Spectral Sensitivity of Diurnal Avians" filed Mar. 17, 2011, that claims priority to and the benefits of U.S. Provisional Patent Application Ser. No. 61/314,617, entitled "Light Sources Adapted to Spectral Sensitivity of Diurnal Avians," which was filed on Mar. 17, 2010, and U.S. Provisional Patent Application Ser. No. 61/314,761, entitled "Dimmable LED Light Engine Adapted to Spectral Sensitivity of Diurnal Avians and Humans," which was filed on Mar. 17, 2010, the entire contents of each of which are incorporated herein by reference.

TECHNICAL FIELD

Various embodiments relate generally to methods and apparatus involving light sources with spectral energy adapted based on light absorbance response of a target avian and humans.

BACKGROUND

This invention relates to minimizing bio-security in an agricultural environment. More specifically this invention relates to using lighting devices to eliminate bacteria within an agricultural environment.

Over the past several decades agriculture in the United States has shifted from being an outdoor business with multiple family farms and cattle and livestock in pens or enclosed by fences outdoors to large indoor facilities where a maximum amount of cattle and livestock are housed. In particular agricultural buildings now have very complex systems for feeding, housing and addressing waste associated with the animals. These operations have become very complex and efficiencies in production have become major drivers in the marketplace.

One problem in the art is that with thousands, if not hundreds of thousands in the case of poultry, of animals within close proximity of one another, keeping a disease free environment is paramount to having a successful operation. In particular, often when visiting an agricultural facility, the owners of the facility will not allow individuals inside the facilities unless at least two weeks have passed since the last time an individual was in a different facility. Other precautions include having personnel go to a doctor for testing for certain bacteria to be cleared before being allowed inside of agricultural facility. Many facilities also require individuals to remove clothing, fully wash and use provided clean clothing before going through a facility. All of these measures are taken because if disease enters a facility thousands of cattle and livestock can be lost within a short period of time and entire flocks or herd must be condemned. This is not only detrimental to the animals, but costly to the operations managers of these facilities.

As agriculture has moved indoors, the lighting within these facilities has also become of great importance. Specifically, animals over years of evolution adapted to an environment that was naturally lighted by the sun. Lighting characteristics of light provided by the sun and artificial lighting are vastly different to one another and effects the animals within the agricultural facilities. In particular animals see and perceive light differently than humans and artificial lighting effects the animals differently than sunlight. Several studies have shown that, for example, poultry broilers that are exposed to artificial lighting emitting blue wavelength of light show increased growth in broilers whereas hens laying eggs exposed to red wavelength of light and red and blue programmed lighting will produce more eggs than typical incandescent light. See Green and Blue Monochromatic Lights Promote Growth and Development of Broiler via Stimulating Testosterone Secretion and Myofiber Growth, Cao et al., J APPL POULT RES 2008, 17:211-218 and Light Spectrum Requirement for Maximizing Breeder Hen Turkeys Egg Production, El Halawani, Gobbles, Vol. 70 No. 4, June 2013.

This is important when creating lighting devices within the agricultural industry. In particular, some lighting devices such as LED lighting devices lend themselves to be able to produce monochromatic or very narrow, very specific wavelengths or colors of light. In fact, because of these properties, and because white light can be created as a result of a combination of different wavelengths of light, LED lighting assemblies can be created that can be used in association with a dimming device to produce a white light from a combination of colored LEDs and then certain strands or colors can be eliminated by using the dimming device to cause the light to change coloring as perceived by humans as seen in U.S. Ser. No. 12/824,215, now U.S. Pat. No. 8,643,308 entitled "Spectral Shift Control for Dimmable AC LED Lighting" to Grajcar; Ser. No. 13/050,910, now U.S. Pat. No. 8,596,804 entitled "Light Sources Adapted to Spectral Sensitivity of Diurnal Avians and Humans" to Grajcar; and Ser. No. 14/033,252 entitled "Light Sources Adapted to the Spectral Sensitivity of Diurnal Avians and Humans" to Grajcar; and Ser. No. 14/070,686 entitled "Light Sources Adapted to the Spectral Sensitivity of Diurnal Avians and Humans" to Grajcar each of which is incorporated in full herein.

While the appearance of the light perceived by humans in these instances go from white to a red, blue or other color, the fact remains that the white light in not white light and instead a combination of different narrow bands of wavelengths such as the blue and red bands. Thus, while a human perceives white, an animal or other living organism can detect and be effected by the individual components of the white lighting. These living organisms are not merely limited to the livestock or cattle within the agricultural facility, but also includes bacteria and other diseasing causing living organisms that are similarly effected by different wavelengths of light. In particular Molecular Mechanism of the Therapeutic Effect of Low-Intensity Laser Radiation, T. I. Karu, Lasers in the Life Sciences 2(1), 1988 pp. 53-74 show that bacteria grown at 632.8 nm shows a larger culture than other wavelengths of light and there is an understanding that 620 nm-630 nm wavelength lighting enhances *E-coli* growth. Conversely, UV to blue wavelength lighting or 400 nm-430 nm actually slowed and even inhibited bacterial growth.

Thus, a principle object of the present invention is to provide an artificial lighting device that both benefits the animal within the artificial environment while optimizing biosecurity.

SUMMARY

Various apparatus and associated methods involve a light source that provides light at wavelengths that substantially correlate to local maxima in the spectral sensitivity of a diurnal avian. In an illustrative example, the light source may output light primarily in wavelength bands that are not substantially absorbed by colored oil droplets and/or visual pigment in at least one type of cone in the eye of a diurnal avian. In some embodiments, the light source may include a light-emitting diode (LED) light source. Exemplary light sources may output spectral components to illuminate diurnal avians with local maxima of intensity at wavelengths that substantially correspond to local maxima in a spectral sensitivity visual response characteristic of the diurnal avians.

Various apparatus and associated methods may further involve use of a light source to adjust the intensities of two sets of wavelengths at substantially different rates as a function of electrical input excitation level, while maintaining a substantially white appearance as perceived by a human. In an illustrative example, as input excitation is reduced, the light source may appear to a human spectral sensitivity characteristic to remain substantially white, with a slight shift in hue. As the input excitation is reduced, the light source may simultaneously appears to significantly shift color temperature as it may be perceived by the spectral sensitivity characteristic of a diurnal avian.

Various embodiments may achieve one or more advantages. For example, some embodiments may improve the welfare and/or lifetime development of avians by stimulation with selected wavelengths tailored to the avian's natural physiology. Some implementations may further provide sufficient illumination perceived by humans who may be working in lighted areas. In poultry lighting applications, for example, the LED source may be driven at substantially high excitation to promote healthy growth at early stages of bird development, and gradually dimmed and color-shifted over the bird's life to promote selected behaviors. In some examples, an avian may perceive a rapid reduction in red and a proportionally small reduction in green or blue as may be desirable for broilers, for example. In some examples, an avian may perceive a rapid reduction in blue and a proportionally smaller reduction in green or red as may be desirable for breeder production, for example. Energy efficiency may be enhanced by selecting wavelengths to reduce energy supplied at wavelengths that are not absorbed or useful to the avian. Various embodiments may advantageously permit smooth, time-controlled turn-on/turn-off and incremental intensity adjustments that may minimize stress or simulate natural transitions of the sun, for example.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
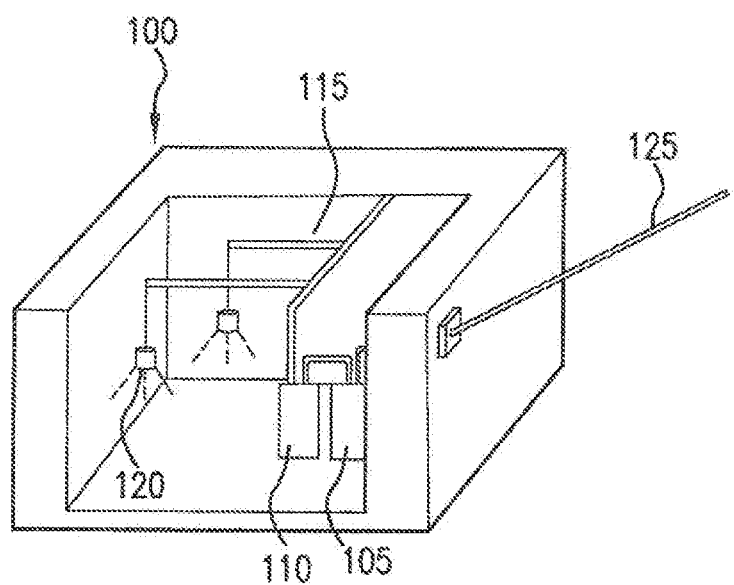
FIG. 1 shows an exemplary lighting installation in a facility for diurnal avians.

FIG. 1 shows an exemplary lighting installation in an agricultural facility for diurnal avians. In this example, FIG. 1 depicts an exemplary poultry facility in which the lighting may provide light energy at wavelengths that substantially correlate to peaks in the spectral sensitivity of the poultry. Various embodiments may advantageously achieve improved energy savings by providing energy primarily in wavelength bands that are not substantially absorbed by colored oil droplets and/or visual pigment in at least one type of cone in the eye of the poultry.

In the example depicted in FIG. 1, a facility 100 includes a circuit breaker panel 105, a controller 110, an electrical distribution system 115, and a number of LED lamp assemblies 120. A pair of conductors 125 provide single phase AC power (e.g., 120-240 VAC, at 50-60 Hz) to the facility from a utility transmission system. Upon entering the facility 100, the AC power is routed through the breaker panel 105 to the controller 110. The controller 110 may be operated (e.g., under control of a programmed processor, or manual input) to provide a controlled reduction of the AC excitation for transmission to the LED lamp assemblies via the electrical distribution system 115. The LED lamp assemblies 120 are located within the facility 100 to artificially illuminate the livestock residing in a livestock area.

The depicted LED lamp assemblies 120 are hanging from electrical cords from an elevated portion of the facility's electrical distribution system 115. In some implementations, the LED lamp assemblies 120 may be mounted as fixtures to infrastructure or supports within the facility 100. The LED lamp assemblies 120 may be located at one or more elevations within the facility, for example, to provide a high bay and/or low bay lighting.

As will be described in further detail with reference to FIGS. 7-10, the lighting system may include one or more types of sources with an intermediate light output signal processed with appropriate wavelength selective conversion to provide light output signals with energy primarily in wavelengths that may be transmitted by the colored oil droplets and pigmentation filters of an avian's cone.

The controller 110 may controllably attenuate the AC excitation voltage and/or current supplied to the LED lamp assemblies 120. By way of example and not limitation, the controller 110 may function as a phase controlled dimmer with leading edge and/or trailing edge phase cutting, pulse width modulation, or amplitude modulation, for example. Exemplary approaches for modulating the AC excitation are described in further detail, for example, at least with reference to FIG. 1 of U.S. Provisional Patent Application entitled "Architecture for High Power Factor and Low Harmonic Distortion LED Lighting," Ser. No. 61/255,491, which was filed by Z. Grajcar on Oct. 28, 2009, the entire contents of which are incorporated herein by reference. The control may be manual or automatically controlled, for example, to provide a desired timing and duration of light and dark cycles (with corresponding color shift provided by operation of examples of the LED light circuit engine). Examples of light systems that incorporate color shift for livestock development are described in further detail, for example, at least with reference to FIGS. 1 and 6C of U.S. Provisional Patent Application entitled "LED Lighting for Livestock Development," Ser. No. 61/255,855, which was filed by Z. Grajcar on Oct. 29, 2009, the entire contents of which are incorporated herein by reference.

In various examples, the controller 110 may include includes a phase control module to control what portion of the AC excitation waveform is substantially blocked from supply to a light engine, where less blockage may correspond to increased excitation level. In other embodiments, the AC excitation may be modulated using one or more other techniques, either alone or in combination. For example, pulse-width modulation, alone or in combination with phase control, may be used to module the AC excitation at modulation frequency that is substantially higher than the fundamental AC excitation frequency.

In some examples, modulation of the AC excitation signal may involve a de-energized mode in which substantially no excitation is applied to the light engine. Accordingly, some implementations may include a disconnect switch (e.g., solid state or mechanical relay) in combination with the excitation modulation control (e.g., phase control module 130). The disconnect switch may be arranged in series to interrupt the supply connection of AC excitation to the light engine. A disconnect switch may be included on the circuit breaker panel 105 that receives AC input from an electrical utility source and distributes the AC excitation to the lamp assemblies 120. In some examples, the disconnect switch may be arranged at a different node in the circuit than the node in the circuit breaker panel 105. Some examples may include the disconnect switch arranged to respond to an automated input signal (e.g., from a programmable controller) and/or to the user input element being placed into a predetermined position (e.g., moved to an end of travel position, pushed in to engage a switch, or the like).

In some implementations, the facility may be used to grow livestock such as poultry, turkey, geese, swine, cows, horses, goats, or the like. By way of example and not limitation, the lighting installation may be used to promote the development of diurnal avians, such as turkeys, ducks, parrots, or chickens including breeders, broilers, or layers, for example.

Figure 2A:
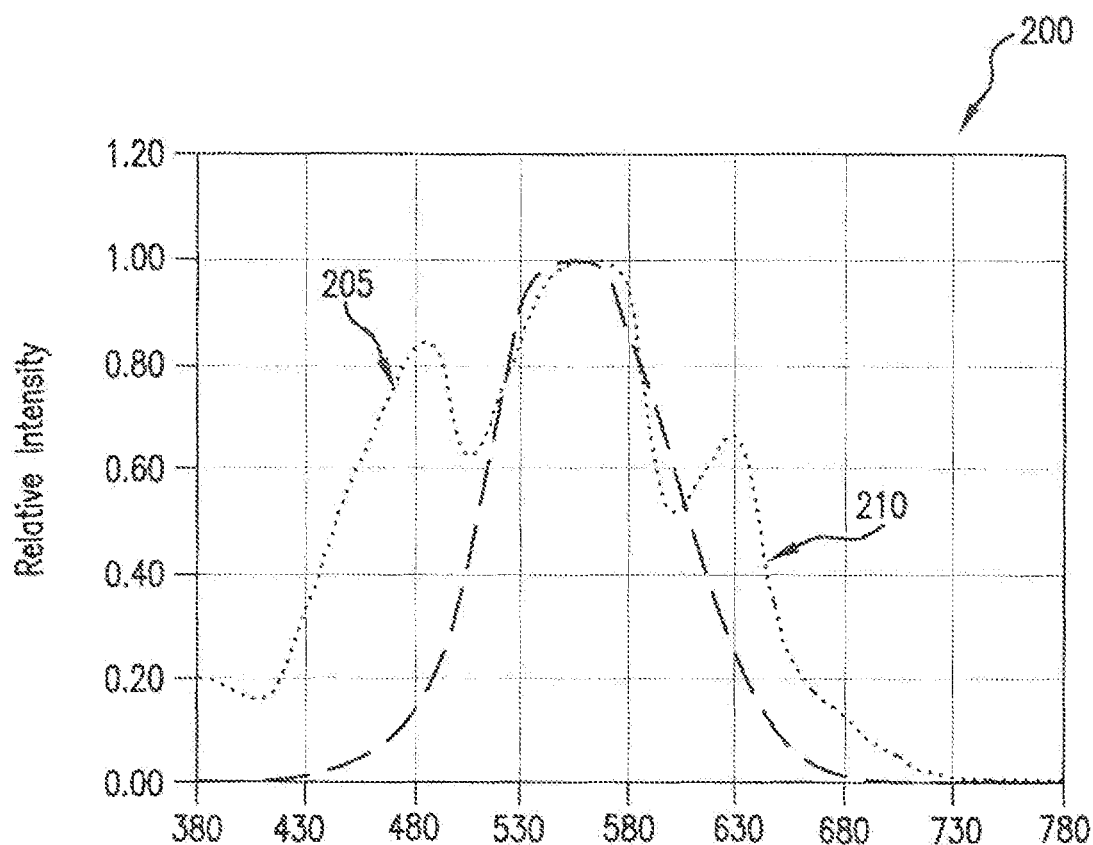
FIG. 2A shows exemplary plots of spectral sensitivity as a function of wavelength for humans and for chickens.

FIG. 2A shows an exemplary plot 200 of spectral sensitivity as a function of wavelength for chickens in a curve 205 and for humans in a curve 210. An exemplary representation of a human's spectral sensitivity, the curve 210 appears approximately as a bell curve with a single peak sensitivity at approximately 555 nm (green). Generally as referred to herein, spectral sensitivity may be understood as a reciprocal measure of the energy or power to provide a particular visual response.

In the depicted figure, the curve 205 provides an exemplary representation of a chicken's spectral sensitivity appears with peaks evident in wavelengths between 380 and 780 nm. In this example, a first peak occurs at about 380 nm, a second peak occurs at about 490 nm, a third peak occurs at about 560 nm, and a fourth peak occurs at about 630 nm. These examples are illustrative and not limiting. Indeed, the amplitude and wavelength and each peak of spectral sensitivity may vary among avian species, among individuals within a species, and for an individual avian over time. For example, an individual diurnal avian may adapt in response to exposure to a set of lighting conditions (e.g., intensity and/or spectral content) by shifting its spectral responsiveness in amplitude and wavelength over time. In some cases, the visual pigmentation may adjust its consistency. In some cases, the number, density and/or distribution of photoreceptors of a particular type may change over time, which may affect a change in an individual avian's spectral sensitivity over time.

According to the exemplary plots in FIG. 2A, chickens and humans have similar sensitivity to green colors (e.g., about 560 nm). Chickens have substantially higher sensitivity to green-blue-ultraviolet (e.g., below about 500 nm) and to orange-red (e.g., above about 600 nm to about 720 nm).

Figure 2B:
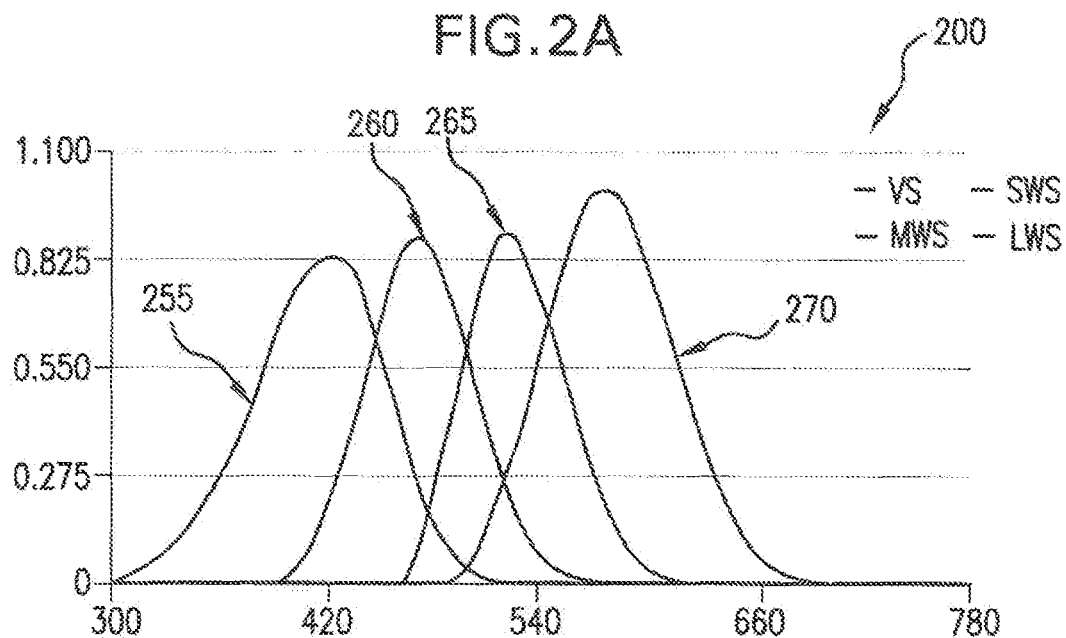
FIG. 2B illustrates exemplary plots of spectral absorbance for four types of oil droplets found in some diurnal avian photoreceptor cells.

By way of illustrative explanation, the tetra-chromatic spectral sensitivity of some diurnal avians may be further understood with reference to FIG. 2B.

FIG. 2B illustrates an exemplary plot 250 of spectral absorbance for four types of oil droplets found in some diurnal avian photoreceptor cells. Unlike some other animals, some avians have photoreceptor cone cells with colored (e.g., pigmented) oil droplets that filter incoming light. Research studies indicate that these oil droplets are highly refractive spherical organelles disposed in some avian cones between the visual pigment and the incident light. As incident light enters the cone of a chicken eye, for example, a colored oil droplet may spectrally filter the light before it reaches the visual pigment. The combined spectral filtering effect of the colored oil droplet and visual pigment may substantially attenuate certain wavelengths, or a band of wavelengths, of the incoming light. Some birds have four types of cones that exhibit different wavelength selective responses. These absorbance characteristics indicate a degree to which incident light will be attenuated as a function of the incident light's wavelength. In an individual cone, with an oil droplet with one of the four depicted absorbance characteristics, light with wavelengths substantially outside of the "bandwidth" of the characteristic may be transmitted substantially without attenuation to a visual pigment element in the cone.

By way of further background as helpful explanation, and not intended to as a limitation, chicken eyes may include four photo-reactive pigments associated with cone cells that provide photopic vision. In contrast, human eye cones have only three pigments. While the human is trichromatic with three pigments, some diurnal avians, such as chickens, may be tetra-chromatic with four pigments.

It is believed that the sensitivity of a particular avian to a particular wavelength is, in part, a function of the number of cones that pass that particular wavelength. Density and distribution of cones of a particular type may thus affect the corresponding sensitivity of the avian to a range of amplitudes of light at any given wavelength.

In some examples, the selective wavelength converter (SWC) may include quantum dots in the optical path. When applied as a film to a die or a lens, for example, the quantum dot material may absorb some of light at one wavelength (e.g., cool blue) and re-emit the light at a substantially different wavelength (e.g., warm red). Accordingly, an optimal spectral output may be pursued by selecting a narrow-band source of a first wavelength in conjunction with wavelength selective conversion using quantum dots. Appropriate selection of source and conversion media may advantageously yield a spectral output with energy at one or more wavelengths that each correspond to a peak of the avian spectral sensitivity. Examples of quantum dots are commercially available from QDVision of Massachusetts.

Diurnal avians include, for example, various galliformes (an order of birds that may include turkeys, grouse, chickens, quails, and pheasants) bird species, which are believed to have among the most complex retinae of any vertebrate.

Retinae of diurnal (e.g., active during day) birds may include a single class of medium wavelength sensitive (MWS) rod, and four classes of single cone with maximum sensitivities to different regions of the spectrum. The single cones may include oil droplets at the distal end of their inner segments. Oil droplets are highly refractive spherical organelles located in the photoreceptor between the visual pigment and the incident light. In all but one of the single cone types, the oil droplets contain short-wavelength absorbing carotenoid pigments that spectrally filter the incident light before it reaches the visual pigment in the outer segments. Pigmented oil droplets act as long-pass cutoff filters and shift the effective sensitivity peak of the cone to a wavelength longer than the long wavelength portion of the passband of the visual pigment contained in the outer segment. They also narrow the spectral sensitivity function of the cone.

In addition to the retinal photoreceptors in the eye, some species have other photoreceptors that may contribute to the overall spectral sensitivity. For example, some species (e.g., chicken) have dorsal photoreceptors oriented in a generally skyward direction when the avian is standing erect. A lighting system may specifically target dorsal photoreceptors with directional (e.g., beam pattern) lighting from above, for example.

Figure 3:
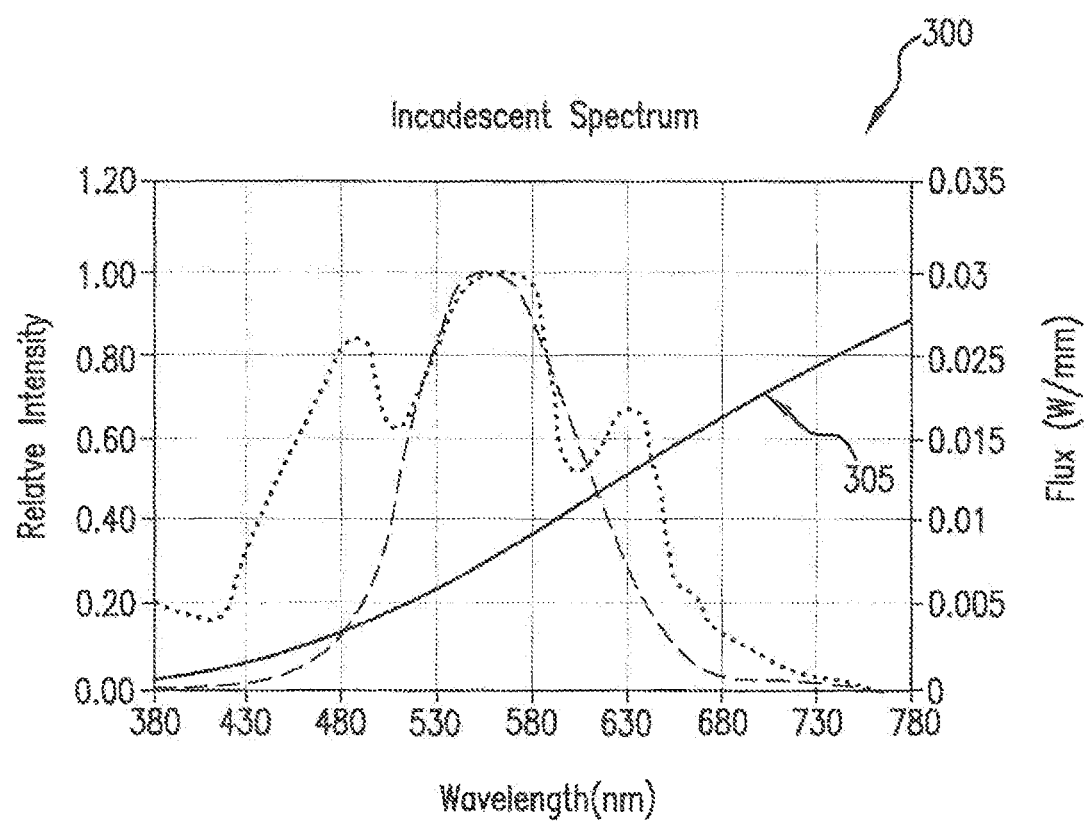
FIGS. 3-5 depict spectral content of exemplary incandescent, fluorescent, and light emitting diode (LED) sources, respectively.
Figure 4:
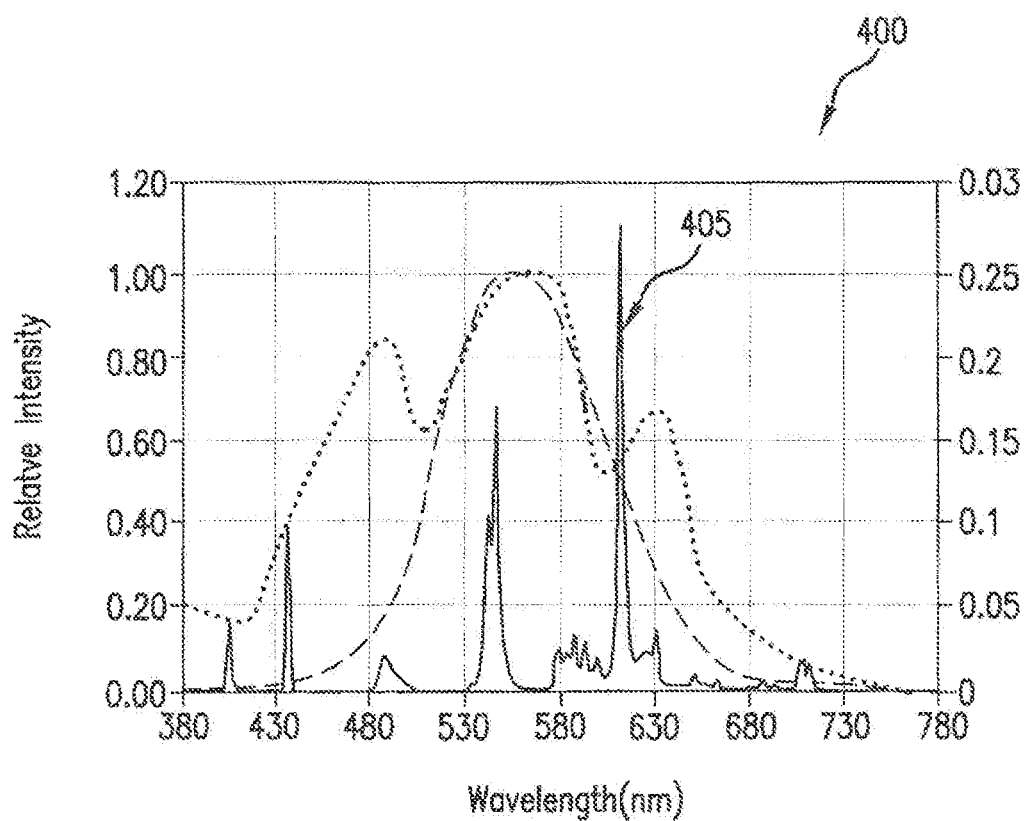
Figure 5:
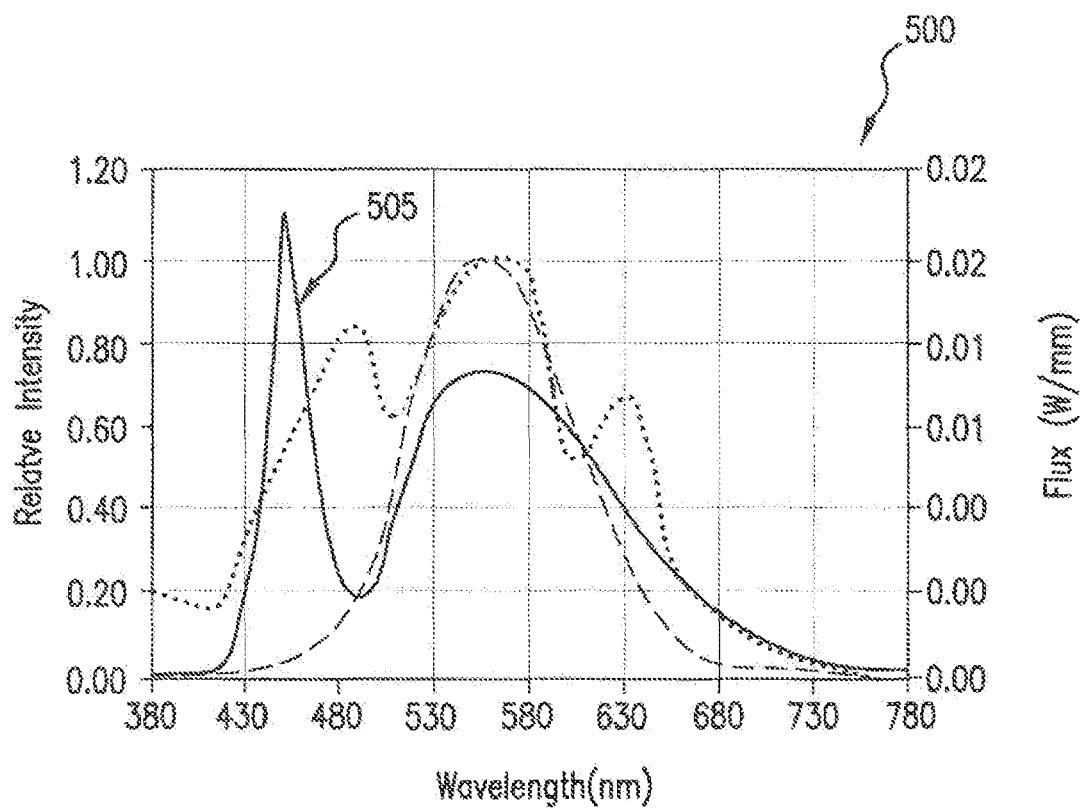

FIGS. 3-5 depict spectral content of exemplary incandescent, fluorescent, and light emitting diode (LED) sources, respectively. The output spectra of these sources are individually overlaid on the relative spectral sensitivity characteristics as described with reference to FIG. 2A.

FIG. 3 depicts a plot of an incandescent spectrum 300. Curve 305 reflects an experimentally measured spectral characteristic for a 60 Watt DOUBLE LIFE™ incandescent bulb, commercially available from General Electric.

FIG. 4 depicts a plot of an incandescent spectrum 400. Curve 405 reflects an experimentally measured spectral characteristic for a 23 Watt SLS-23 fluorescent bulb, commercially available from Philips Lighting Company of New Jersey.

FIG. 5 depicts a plot of an incandescent spectrum. Curve 505 reflects an experimentally measured spectral characteristic for an arrangement of high power 1 W LEDs, model EHP-A21/GT46H-P01/TR, commercially available from Everlight Electronics Co., Ltd. of Taiwan.

Figure 6:
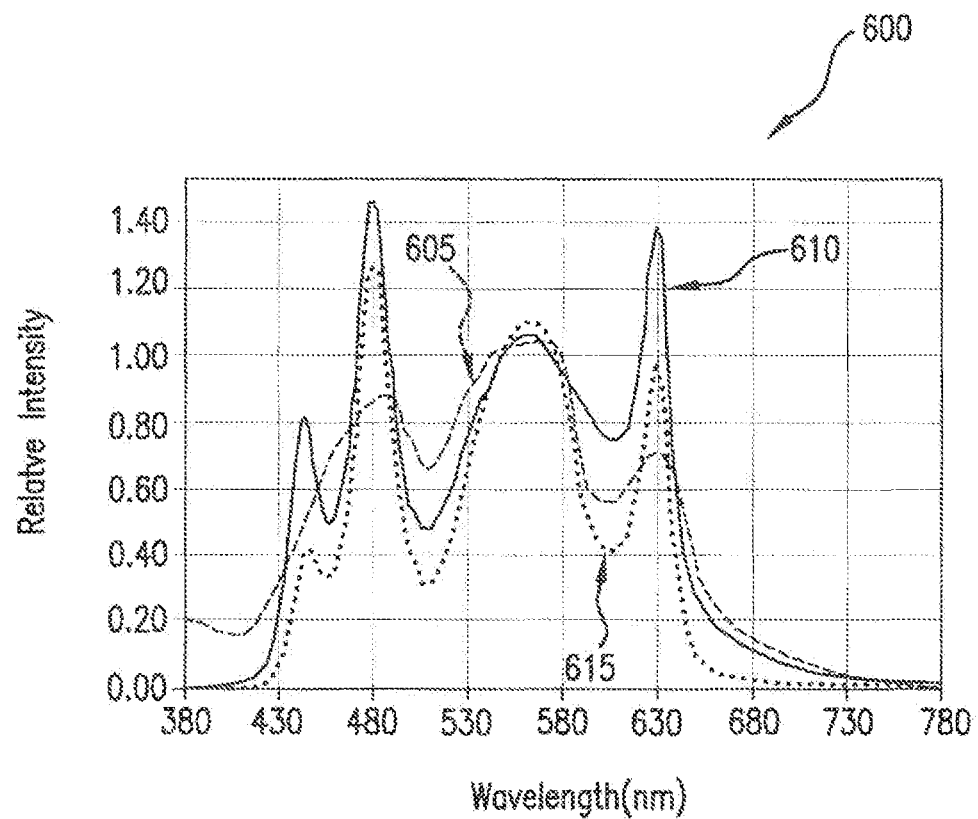
FIG. 6 depicts a characteristic for an exemplary composite source adapted to provide light energy at wavelengths that substantially correlate to peaks in the spectral sensitivity of a chicken.

FIG. 6 depicts a characteristic for an exemplary composite source adapted to provide light energy at wavelengths that substantially correlate to peaks in the spectral sensitivity of a chicken. A plot 600 indicates relative intensity as a function of wavelength (nm) for: a domestic fowl relative eye response curve 605, an exemplary composite source 610, a curve 615 representing what the domestic fowl perceives from the composite source. Exemplary implementations that may yield the depicted source spectral output 610 are described with reference to FIGS. 7A-8C.

In an illustrative example, the curve 615 represents an exemplary characteristic visual response to the composite light source spectrum as perceived by the chicken 615. The visual response characteristic is a function of the spectral sensitivity to the light source at each wavelength, and the sensitivity of the chicken at the corresponding wavelength.

In particular, the depicted light source characteristic curve 610 has peak of intensity at about 480 nm. A pass band (e.g., between about 460-500 nm) associated with this peak represents energy that is substantially within the bandwidth of the second peak of the chicken spectral sensitivity around about 500 nm, which has an approximate bandwidth that may be considered to include at least between about 450-520 nm. Similarly, the composite source includes peaks that lie substantially within a bandwidth of the chicken's spectral sensitivity peaks at about 560 nm and about 630 nm, respectively.

Moreover, the composite source exhibits relatively low energy content, or local minima of intensity, at wavelengths that substantially correspond to local minima of the chicken's spectral sensitivity. In the depicted example, the composite source may be seen to have substantially minimal or local intensity minima at corresponding sensitivity minima (e.g., about 410 nm, 510 nm, 605 nm, or above about 680 nm in this example).

FIGS. 7A-7D depict exemplary implementations of sources to form a composite source adapted to provide light energy at wavelengths that substantially correlate to peaks in the spectral sensitivity of a diurnal avian. Each implementation may be formed from a combination of one or more types of sources, including, but not necessarily limited to, the sources described with reference to FIGS. 3-5. Some composite sources may further include metal halide, high pressure sodium, or other high intensity discharge source. A composite source may be formed of a single type of source, alone or in combination with one or more sources, to obtain a composite source adapted to provide light energy at wavelengths that substantially correlate to peaks in a spectral sensitivity of a specified diurnal avian.

Figure 7A:
FIG. 7A-7D depict exemplary implementations of sources to form a composite source adapted to provide light energy at wavelengths that substantially correlate to peaks in the spectral sensitivity of a diurnal avian.
Figure 7B:
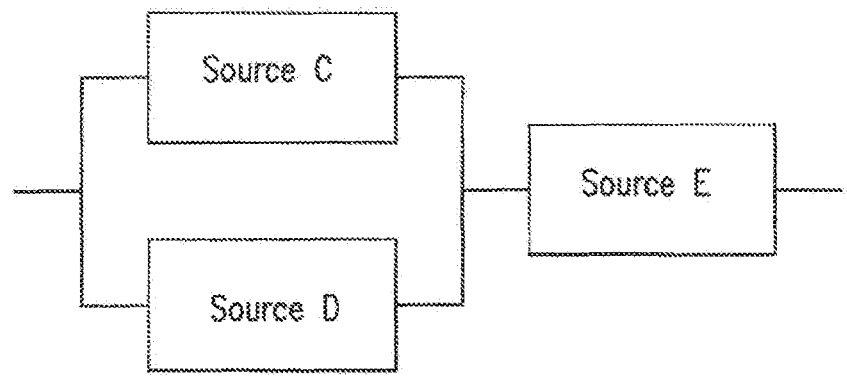
Figure 7C:
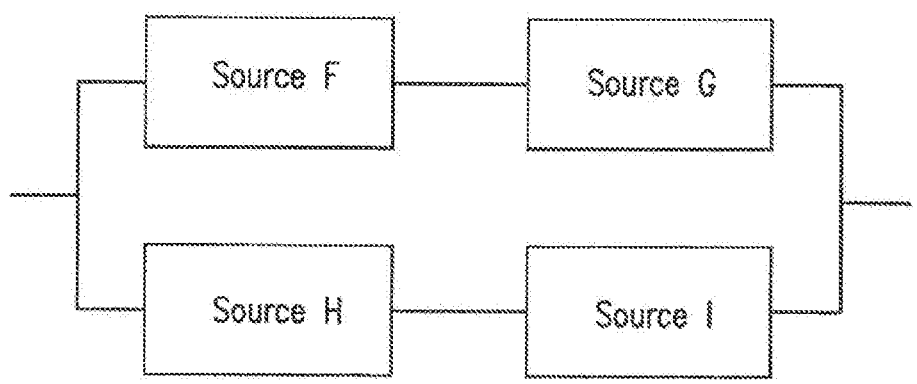
Figure 7D:
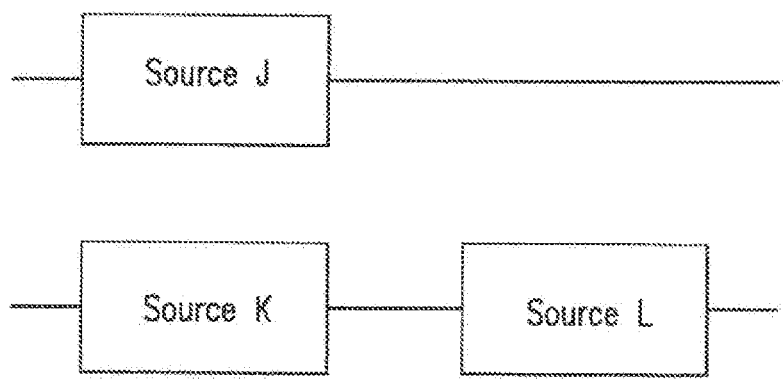

FIGS. 7A-7D depict exemplary networks of two or more sources A-L to form a composite source. In some examples, each of the sources A-L may each individually include a network that includes one or more elements of a single type of source (e.g., at least one fluorescent bulb, a network of one or more LEDs, an array of incandescent bulbs). Each network may include sources having selected wavelength output spectra to achieve the specified composite output that substantially matches at least portions of the diurnal avian's spectral sensitivity characteristics. Some exemplary networks may include two or more elements of the same source type arranged in series, parallel, and/or combinations of series and parallel, including two or more parallel branches. In FIG. 7A, for example, the same excitation current flows through both of the sources A, B, and the excitation may be either AC or DC. In FIG. 7B, for example, sources J and K-L are independent branches that may be independently excited with different voltage and/or current, and the excitation to either branch may be either AC or DC.

FIG. 8 shows exemplary architectures for implementing a composite source from various sources.

Figure 8A:
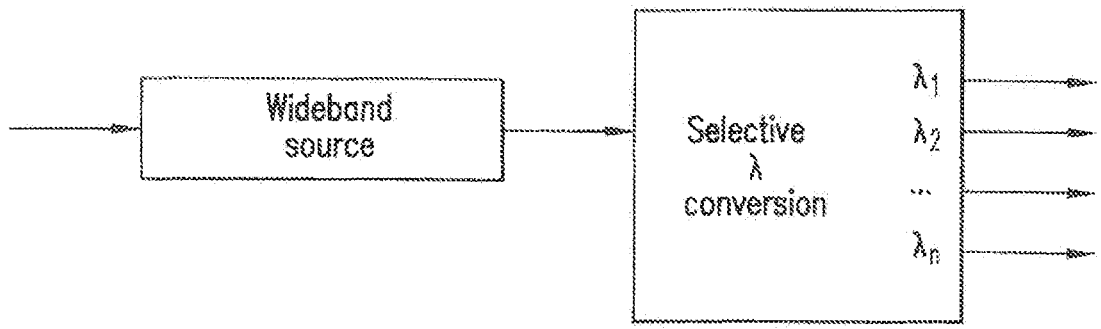
FIG. 8A-8C show exemplary architectures for implementing a composite source from various sources.

In FIG. 8a, a wideband source supplies a light signal to be processed by a selective wavelength converter (SWC). The SWC processes the light signal from the wideband light source using apparatus or techniques to substantially shift energy content at one or more selected wavelengths to different wavelengths. By appropriate selection of source and SWC, a composite source may be created to output light at wavelengths that substantially match a diurnal avian's spectral characteristic.

In some embodiments, the selective wavelength converter (SWC) may include quantum dots in the optical path, as described with reference to FIG. 2B.

In some other embodiments, the SWC may include a phosphor-like material that emits light at one wavelength in response to stimulation at a different wavelength.

In some examples, the composite source may use, for example, a number of incandescent bulbs arranged in series as a substantially wideband source. A film of quantum dots and/or phosphors may be provided in the optical path of the LED output to shift some energy, for example, from a red spectrum to a green and/or a blue portion of the spectrum. The resulting output of the composite source may substantially match (e.g., lie substantially within the pass band of) at least three of the peaks and at least two local minima of the diurnal avian's spectral sensitivity response characteristic.

Figure 8B:
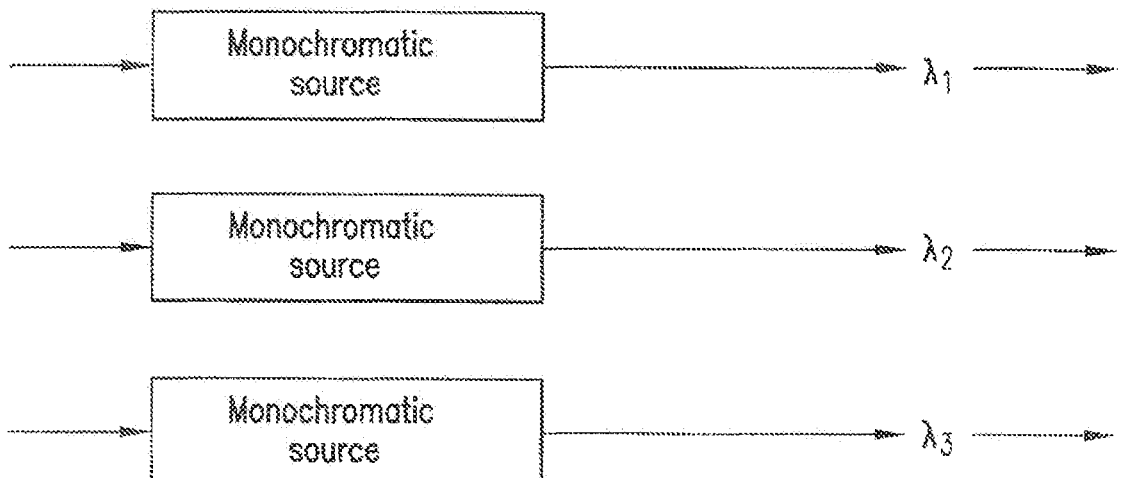

FIG. 8B depicts an exemplary composite sourced formed by three independent monochromatic sources. For example, a network of green, red, and blue LEDs may output arranged in a network (e.g., in accordance with any of FIGS. 7A-7D) combined light signal that substantially matches a sensitivity spectral characteristic of a chicken.

Figure 8C:
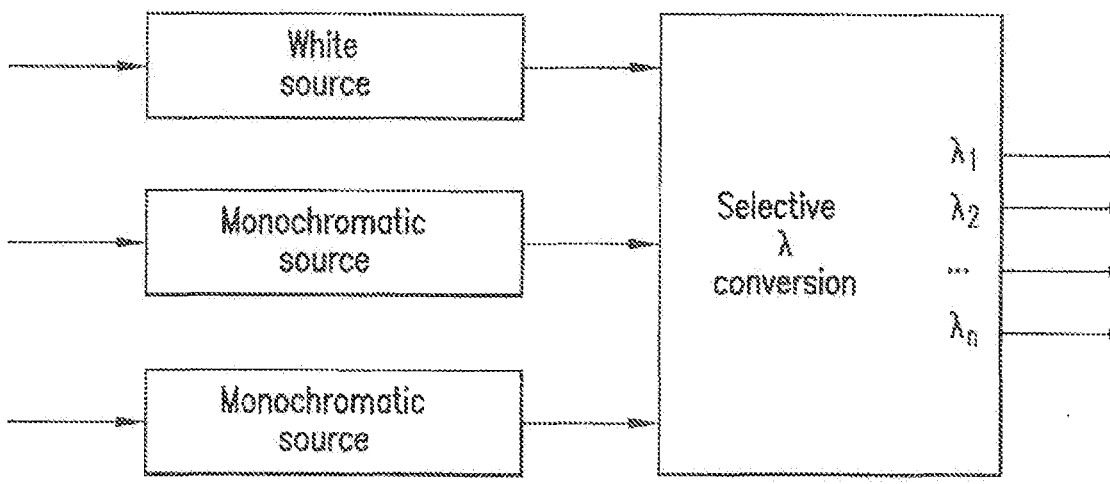

FIG. 8C depicts an exemplary composite sourced formed by a white source and two independent monochromatic sources in conjunction with a SWC. For example, a network of cool white LEDs may serve as the "white" source, and red and/or blue LEDs may serve as the two monochromatic sources. The SWC may shift at least some energy in order to provide peaks of the composite light source intensity that fall substantially within a pass band of at least 2 of the peaks of the avian spectral sensitivity characteristic.

Figure 9:
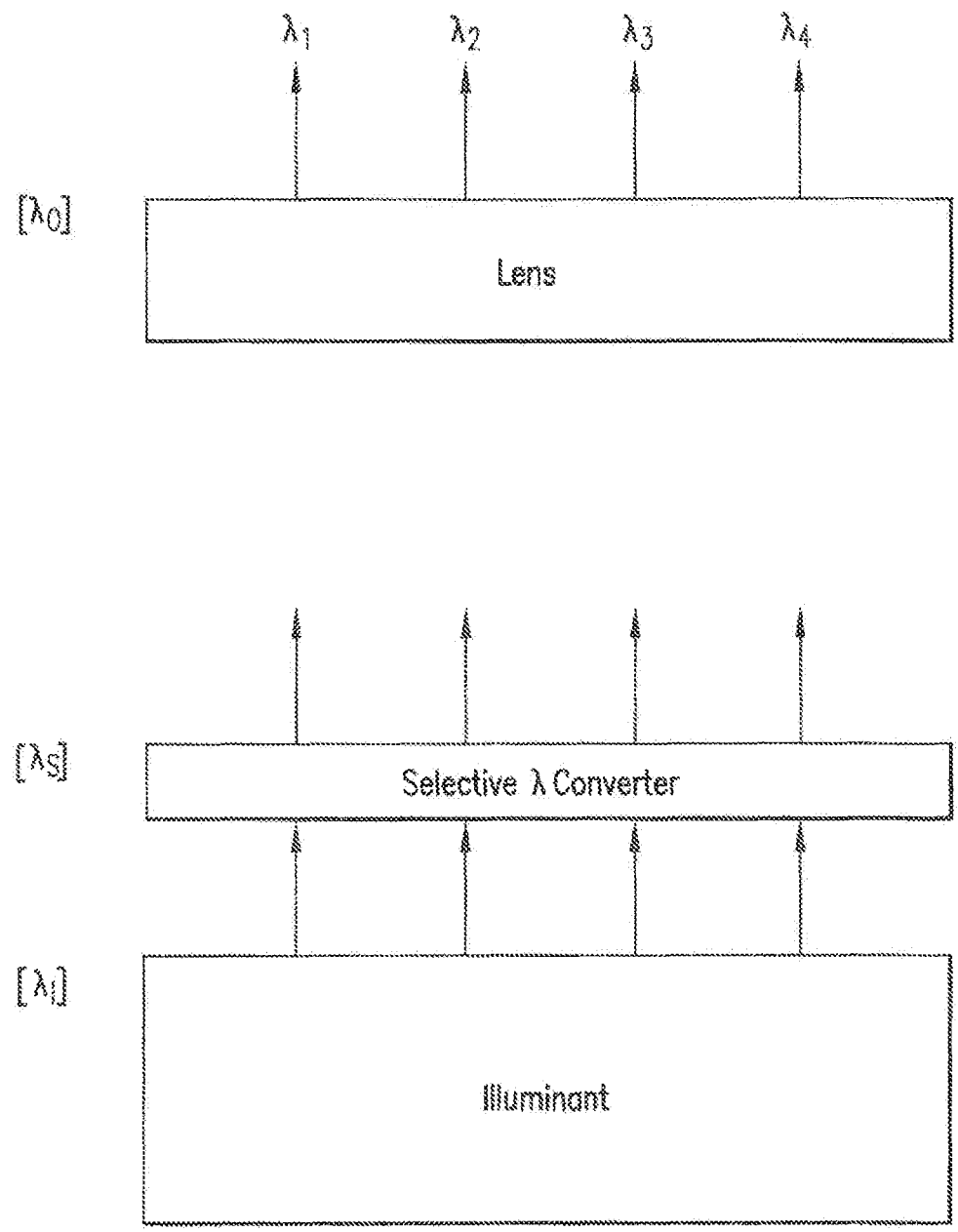
FIG. 9 depicts an exemplary light source device adapted to substantially match at least portions of the diurnal avian's spectral sensitivity characteristics.

FIG. 9 depicts an exemplary light source device adapted to substantially match at least portions of the diurnal avian's spectral sensitivity characteristics. In this figure, an illuminant substrate outputs a first set of wavelengths that are directed generally upward from a top surface of the illuminant. The illuminant may include one or more units of a source (e.g., one or more LEDs, fluorescent elements, incandescent elements).

The first set of wavelengths pass through a SWC provided as a film or layer in the optical path. The SWC may be implemented in various embodiments as described above, including quantum dots, phosphors, or a combination thereof. The spectral content of the light emitted by the SWC has at least some energy at wavelengths that have shifted with respect to the spectral content emitted by the illuminant. The optical path in this example further includes a lens, which may or may not incorporate another SWC element to further tailor the spectral content of the composite source to more accurately match the spectral sensitivity characteristic of the avian.

Figure 10:
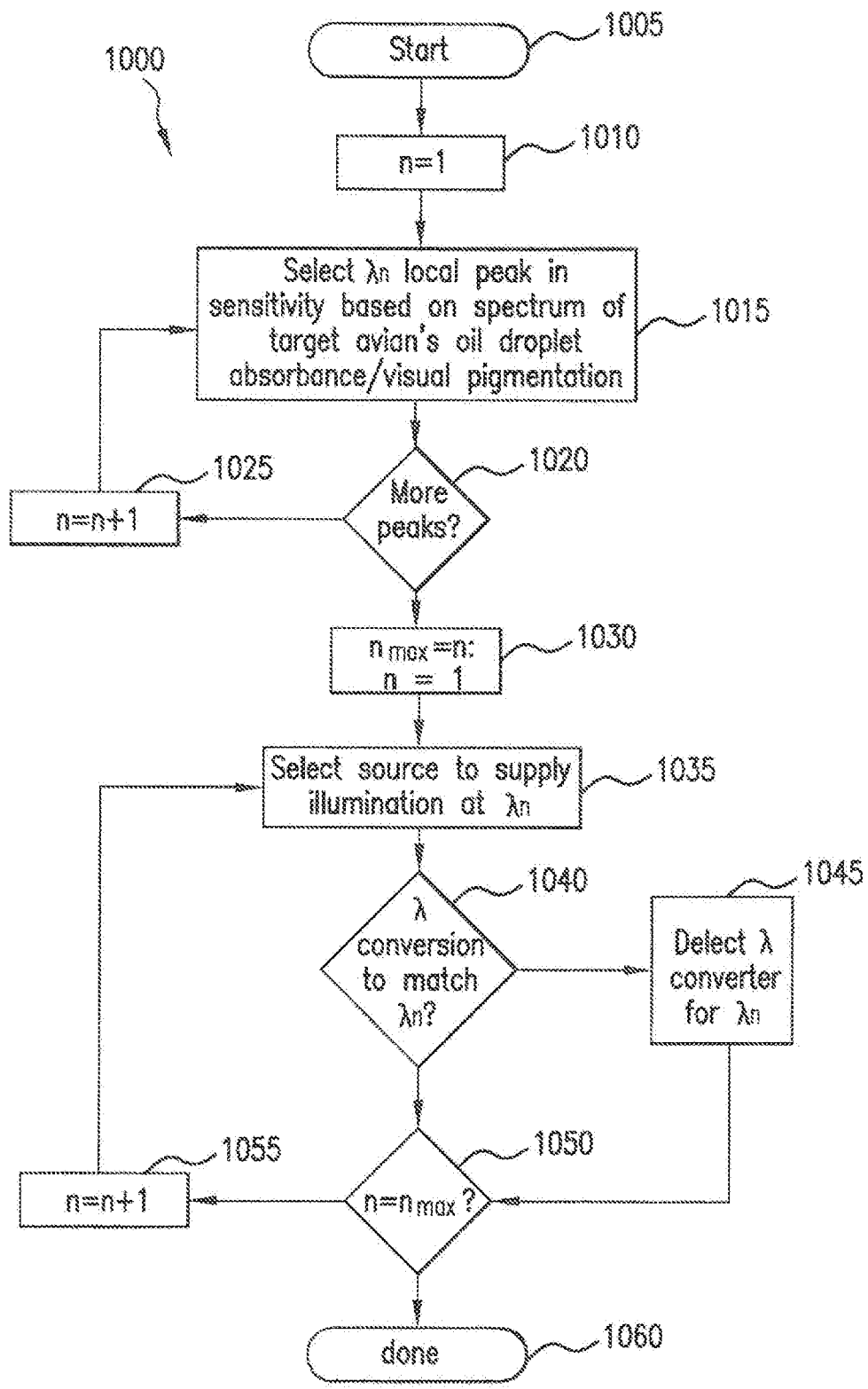
FIG. 10 is a flowchart of an exemplary method to provide a composite source adapted to provide light energy at wavelengths that substantially correlate to peaks in the spectral sensitivity of a diurnal avian.

FIG. 10 is a flowchart of an exemplary method to provide a composite source adapted to provide light energy at wavelengths that substantially correlate to peaks in the spectral sensitivity of a diurnal avian. The method 1000 may be implemented by a processor executing operations according to a set of instructions retrieved from a data store. Some or all of the steps of the method may be implemented by at least one processor that is included in at least one computer, such as a desktop, laptop, server, or portable digital device.

When started at step 1005, the method 1000 includes a step 1010 for initializing an index (n) to one. Then, at step 1015, the processor selects a wavelength for the index at which there is a local peak in sensitivity based on a spectrum of the target avian's oil droplet absorbance and visual pigmentation. In some embodiments, oil droplet absorbance information and information about spectral transmission through visual pigments for a particular species of diurnal avian may be stored as records in a data store. If there are more peaks of the sensitivity to identify at step 1020, then the index increments and the wavelength selection step 1015 is repeated.

When all the peaks have been identified, at step 1030 the maximum number of peaks is stored (nmax), and the index is reset to one. Then, the processor performs operations to select a source to supply illumination at the wavelength for the index at step 1035.

If, at step 1040, a selective wavelength conversion is required to match the source wavelength spectrum to the selected wavelength at the index, then the processor performs operations at step 1045 to select a selective wavelength converter (SWC) suitable to convert the selected source to the selected wavelength for the index. For example, the SWC may be a phosphor alone or in combination with a film of quantum dots.

If the index has not reached nmax at step 1050, then the index increments at step 1055 and the source selection step 1035 is repeated. When all the selected peaks have been associated with a source and any required SWC, the method ends at step 1060.

Figure 11A:
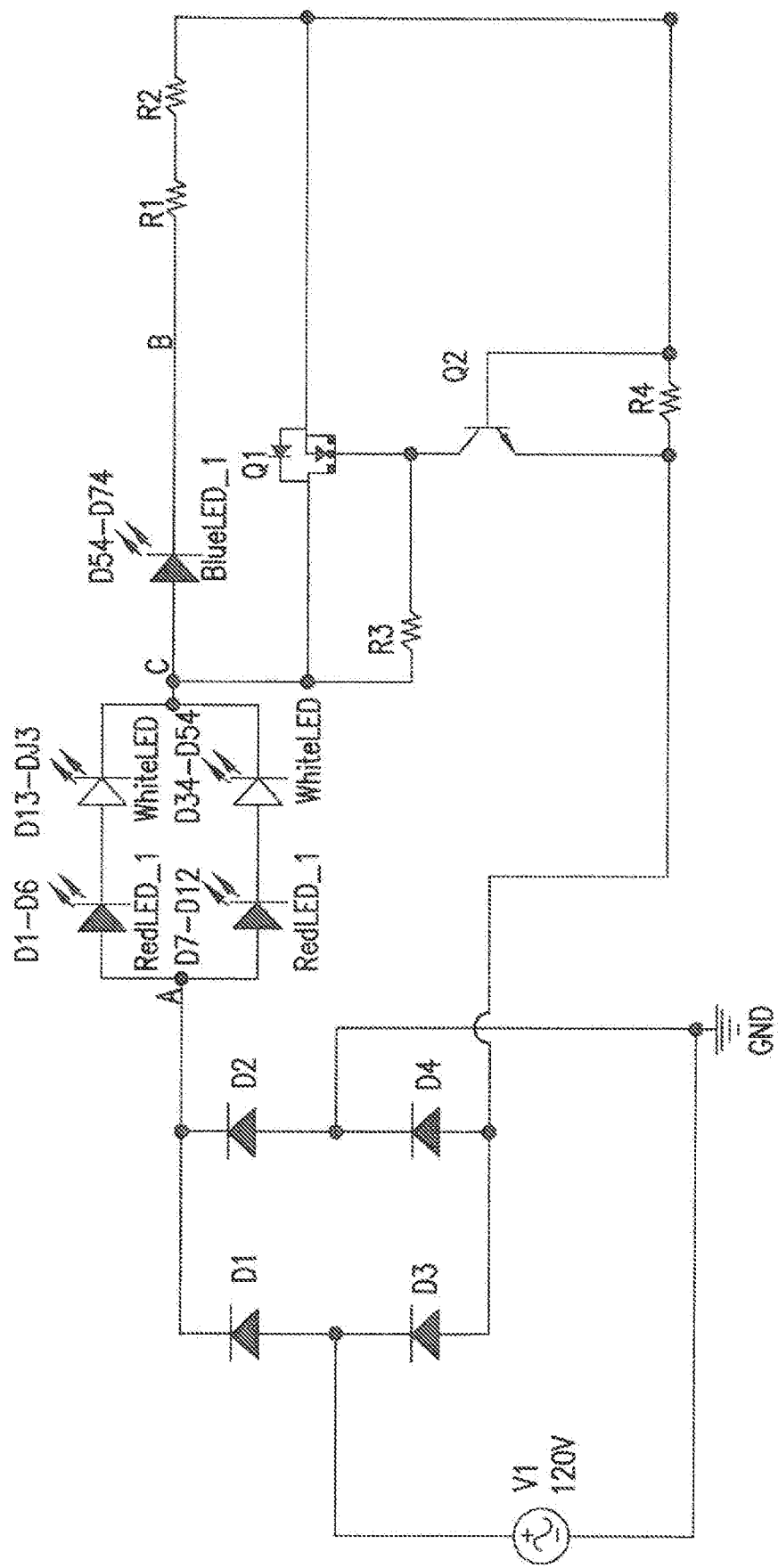
FIGS. 11A-11B show schematics of exemplary conditioning circuits for an LED light engine with selective current diversion to bypass a group of LEDs while AC input excitation is below a predetermined level, with spectral output to substantially match about three spectral sensitivity peaks of a diurnal avian and appear substantially white to human vision.
Figure 11B:
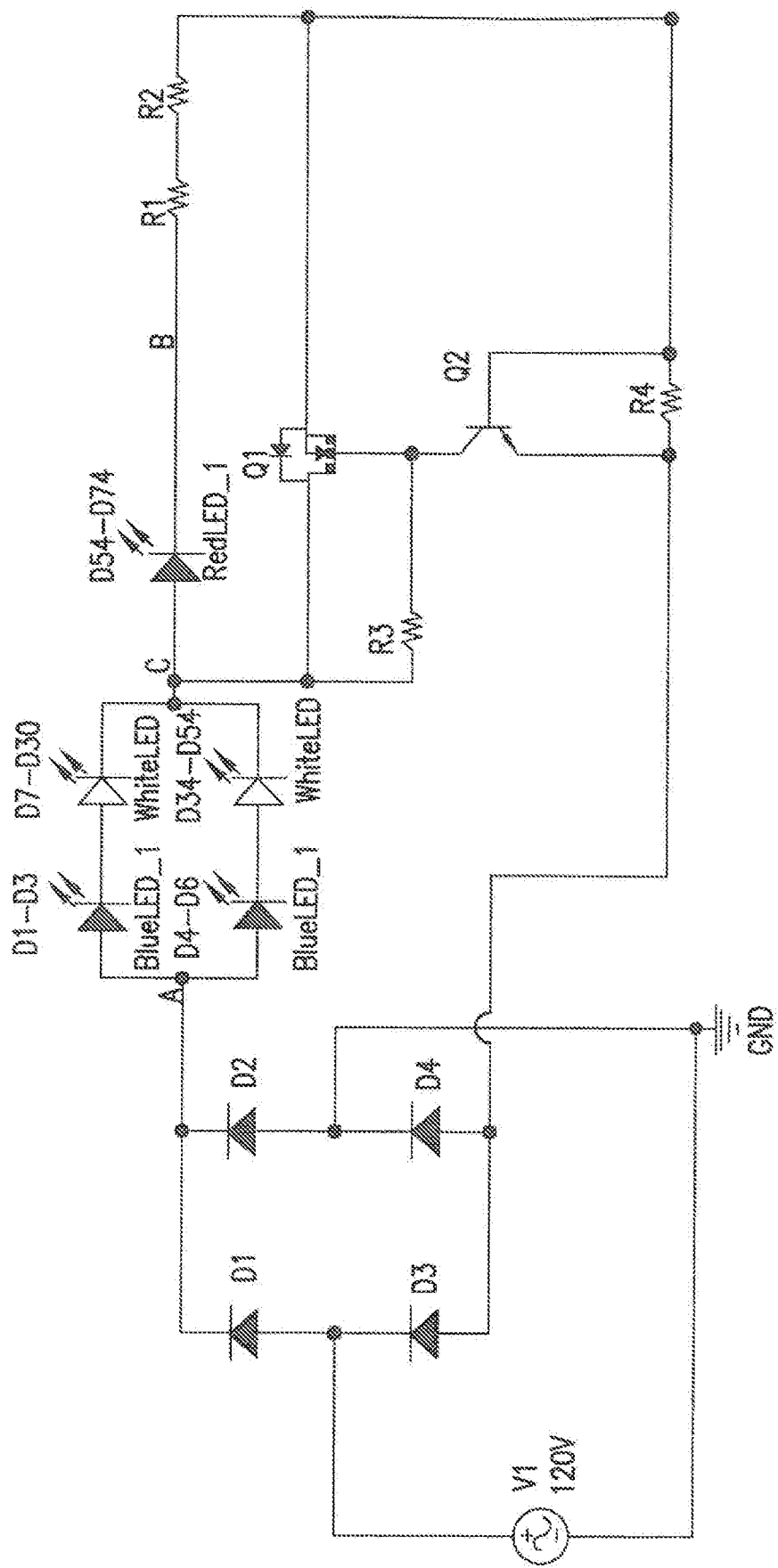

FIGS. 11A-11B show schematics of exemplary conditioning circuits for an LED light engine with selective current diversion to bypass a group of LEDs while AC input excitation is below a predetermined level, with spectral output to substantially match about three spectral sensitivity peaks of a diurnal avian and appear substantially white to human vision. In particular, the combination of LED outputs may provide a spectral energy that substantially matches a spectral sensitivity of a selected diurnal avian. In some embodiments, the LED output spectrum may be provided by an LED (or combination of LEDs) in combination with a selective wavelength converter (SWC), examples of which are described with reference, for example, at least to FIGS. 8-10 of U.S. Provisional Patent Application entitled "Light Sources Adapted to Spectral Sensitivity of Diurnal Avians," Ser. No. 61/314,617, which was filed by Z. Grajcar on Mar. 17, 2010, the entire contents of which are incorporated herein by reference.

FIG. 11A depicts 40 white and 12 red LEDs in a first group between nodes A,C, referred to herein as the "RUN"

group of LEDs, and with 10 blue LEDs in a second group between nodes C, B, referred to herein as the "BYPASS" group of LEDs.

FIG. 11B depicts 48 white and 6 blue LEDs in the "RUN" group, and 20 red LEDs in the "BYPASS" group.

As depicted, the exemplary light engine includes a circuit excited by an AC (e.g., substantially sinusoidal) voltage source V1. The AC excitation from the source V1 is rectified by diodes D1-D4. A positive output of the rectifier, at node A, supplies rectified current to a first set of LEDs, LED1-LED54, (RUN LEDs) which are connected as a network of two parallel strings from node A to node C.

At node C, current may divide between a first path through a second set of LEDs and a second path through a current diversion circuit. The first path from node C flows through the second set of LEDs, LED55-LED74, (BYPASS LEDs) to a node B, and then on through a series resistance, R1 and R2. In some embodiments, a peak current drawn from source V1 may depend substantially on the series resistance R1 and R2.

The second path from node C flows through a selective current diversion circuit that includes Q1, Q2, R3, and R4. In some examples, the current drawn from the source V1 at intermediate excitation levels may depend substantially on the selective current diversion circuit.

In some embodiments, the schematics of FIGS. 11A-11B may be modified to arrange LEDs in different series and/or parallel networks. For example, the RUN group in FIG. 11A may include three or more branches of LEDs red and/or white LEDs. In another example, the RUN group in FIG. 11B may include one or more blue and/or white LEDs in a serial and/or parallel network examples that is itself in series with the depicted parallel network. In another embodiment, the BYPASS group of LEDS may include additional LEDs to tailor the spectral output, such as a number of white (e.g., cool white) LED sources.

The RUN and BYPASS groups of LED1-LED74 may be in a single module such as a hybrid circuit module or assembly. In some examples, the LEDs LED 1-LED74 may be arranged as individual or discrete packages and/or in groups of LEDs. The individual LEDs may output all the same color spectrum in some examples. In other examples, one or more of the LEDs may output substantially different colors than the remaining LEDs. Various embodiments may utilize inexpensive low CRI (color rendering index) LEDs.

The number of LEDs is exemplary, and is not meant as limiting. For example, the number of red or blue LEDs may be 1, 2, 3, 4, 5, 6, 7, 8, 9, 10, 11, 12, 13, 14, 15, 16, 20, 24, or at least 30 or more, for operation on 120 VAC excitation, and may be further adjusted according to brightness, spectral content, other LEDs in the circuit, circuit arrangement (e.g., two or more parallel branches) and/or LED forward voltage, for example. The number of white LEDs may be increased using the depicted arrangement to include from about 18 to about 38 white LEDs, such as between about 21 to 27 LEDS.

The number of LEDs may be designed according to the forward voltage drop of the selected LEDs and the applied excitation amplitude supplied from the source V1. The number of LEDs in the first set between nodes A, C may be reduced to achieve an improved power factor. The LEDs between nodes A, C may be advantageously placed in parallel to substantially balance the loading of the two sets of LEDs according to their relative duty cycle, for example. In some implementations, current may flow through the RUN LED group whenever input current is being drawn from the source V1, while the current through the BYPASS LED group may flow substantially only above a threshold voltage excitation from the source V1.

Suitable LEDs may be selected according to their color output to create a combine spectral output in accordance, for example, with the exemplary spectra described with reference to FIGS. 12A-12C. By way of example, and not limitation, a representative example of suitable LEDs may include models EHP-A21/UB01H-P01/TR or EHP-A21/GT46H-P01/TR, which are commercially available from Everlight Electronics Co., Ltd. of Taiwan; models SLHNNWW629T00S0S373 or SPMRED3215A0AEFCSC, which are commercially available from Samsung LED Co., LTD. of Korea.

The spectral output of one or more of the LEDs may be tailored by converting energy from one wavelength to a different wavelength, for example, using selective wavelength conversion (SWC) techniques. Examples of SWC techniques using phosphors or quantum dots are described in further detail with reference to at least FIGS. 8-9 of U.S. Ser. No. 61/314,617.

Figure 12A:
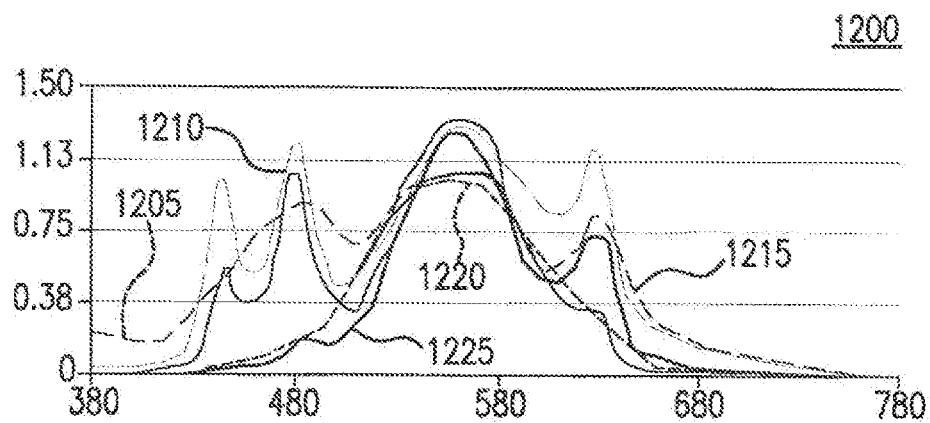
FIGS. 12A-12C show relative plots of human and chicken spectral sensitivity that may be provided by the light engines described with reference to FIGS. 11A and 11B.
Figure 12B:
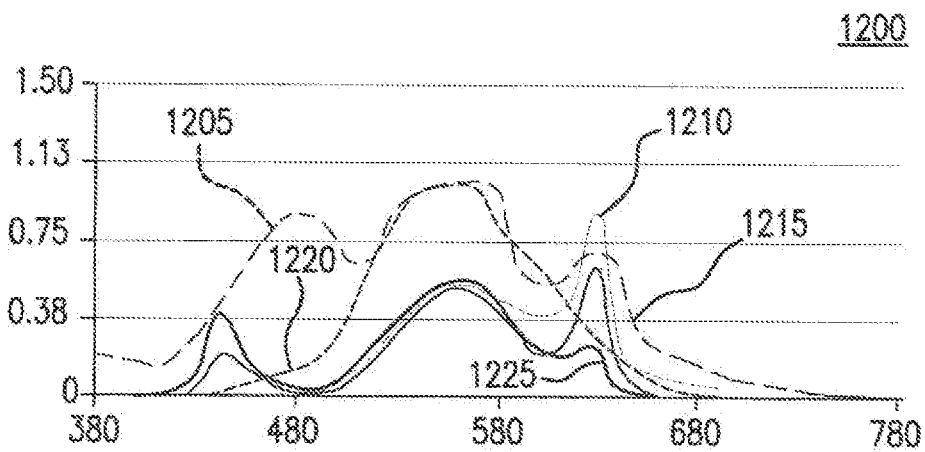
Figure 12C:
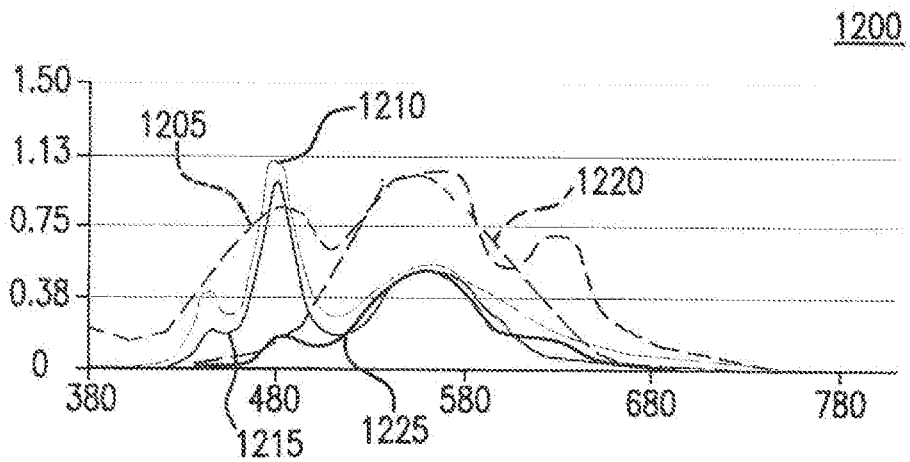

FIGS. 12A-12C show relative plots of human and chicken spectral sensitivity that may be provided by the light engines described with reference to FIGS. 11($a,b$). The exemplary human characteristic spectral sensitivity curve 1220 (e.g., bell curve shape plot) and an exemplary chicken predetermined characteristic spectral sensitivity curve 1205 (3 peaks between 400-680 nm) depict spectral sensitivities shown in dashed lines, examples of which are discussed in further detail with reference to at least FIG. 12A of U.S. Ser. No. 61/314,617.

FIG. 12A depicts that an exemplary intensity plot 1210 for an exemplary light engine at a first intensity level, which may be considered here to be 100% full intensity for purposes of illustration. A chicken visual response curve 1215 and a human visual response curve 1225 depict the respective responses to the light source curve 1210. The light engine output may be produced, for example, by either of the circuits of FIGS. 11($a, b$) operating at full intensity.

In this illustrative example, the human visual response generally matches the shape and bandwidth of the bell curve for the human spectral sensitivity characteristic.

The chicken's visual response extends to wavelengths above and below the "pass band" of the human characteristic. The chicken visual response peaks around wavelengths at which the chicken spectral sensitivity and the LED light source have their local maxima (e.g., around 480 nm, 560 nm, and 600 nm).

FIG. 12B represents exemplary intensity plots for a light engine, including the circuit of FIG. 11A, at a first reduced intensity level, which may be considered here to be 40% full intensity for purposes of illustration. The chicken 1215 and human 1225 visual responses to this light source 1210 are also plotted. The light engine output may be produced by the circuit of FIG. 11A operating at about 40% intensity (e.g., a reduced input excitation voltage level).

FIG. 12B illustrates that LED source intensity has a different spectral profile than FIG. 12A. In particular, blue colors (e.g., wavelengths below 470 nm) associated with the blue LEDs in the BYPASS LED group are substantially more attenuated than the intensity of red colors (e.g., wavelengths above about 620 nm) associated with the red LEDs in the RUN group of FIG. 11A. The different rates of attenuation may be accounted for by the conditioning operations of the selective diversion circuitry.

In response to the light source spectral profile of FIG. 12B, the human visual response generally matches the shape and bandwidth of the bell curve for the human spectral sensitivity characteristic. As such, a typical human may perceive the light as dimmer, but still with the appearance of white light with reasonably good color rendering. The human perception may be considered to be substantially white with a slight reddish hue.

The chicken's visual response to the source includes substantially reduced perception of most blue color, while maintaining substantial green and red, albeit at a partially reduced intensity compared to FIG. 12A. As an illustrative example, this reddish color may advantageously conserve energy otherwise supplied in the blue spectrum, while being perceived by the chicken as reasonably bright illumination with red content that may, according to some research, promote breeding activities.

As such, the circuit of FIG. 11A may be advantageous as a highly efficient lighting system tailored for breeder chickens, for example. Even though the chicken perceives a substantial color shift towards the red spectrum and away from blue, embodiments of the circuit of FIG. 11A may further be advantageous as a light to permit humans to see with good color rendering over a wide dimming range.

FIG. 12C represents exemplary intensity plots for a light engine, including the circuit of FIG. 11B, at a first reduced intensity level, which may be considered here to be 40% full intensity for purposes of illustration. The chicken 1215 and human 1225 visual responses to this light source 1210 are also plotted. The light engine output may be produced by the circuit of FIG. 11B operating at about 40% intensity (e.g., a reduced input excitation voltage level).

FIG. 12C illustrates that LED source intensity has a different spectral profile than FIG. 12A. In particular, red colors associated with the red LEDs in the BYPASS LED group are substantially more attenuated than the intensity of blue colors associated with the blue and/or cool white LEDs in the RUN group of FIG. 11B. The different rates of attenuation may be accounted for by the conditioning operations of the selective diversion circuitry.

In response to the light source spectral profile of FIG. 12C, the human visual response generally matches the shape and bandwidth of the bell curve for the human spectral sensitivity characteristic. As such, a typical human may perceive the light as dimmer, but still with the appearance of white light with reasonably good color rendering. The human perception may be considered to be substantially white with a slight bluish hue (e.g., due to a small peak around 480 nm in this example).

The chicken's visual response to the source includes substantially reduced perception of most red color, while maintaining substantial green and blue, albeit at a lower intensity compared to FIG. 12A. As an illustrative example, this bluish color may advantageously conserve energy otherwise supplied in the red spectrum, while being perceived by the chicken as reasonably bright illumination with blue-green content that may, according to some research, promote growth and non-aggressive behaviors.

As such, the circuit of FIG. 11B may be advantageous as a highly efficient lighting system tailored for broiler chickens, for example. Even though the chicken perceives a substantial color shift towards the blue spectrum and away from red, embodiments of the circuit of FIG. 11B may further be advantageous as a light source to permit humans to see with good color rendering over a wide dimming range.

Figure 13A:
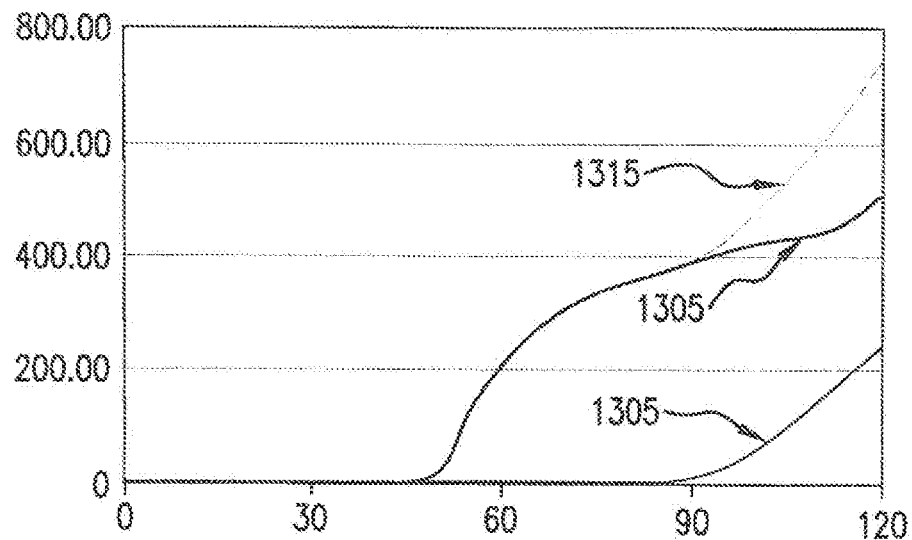
FIGS. 13A-13B illustrate exemplary plots of light output from the RUN and BYPASS LEDs, and their combined total output, over a range of input voltage excitation.
Figure 13B:
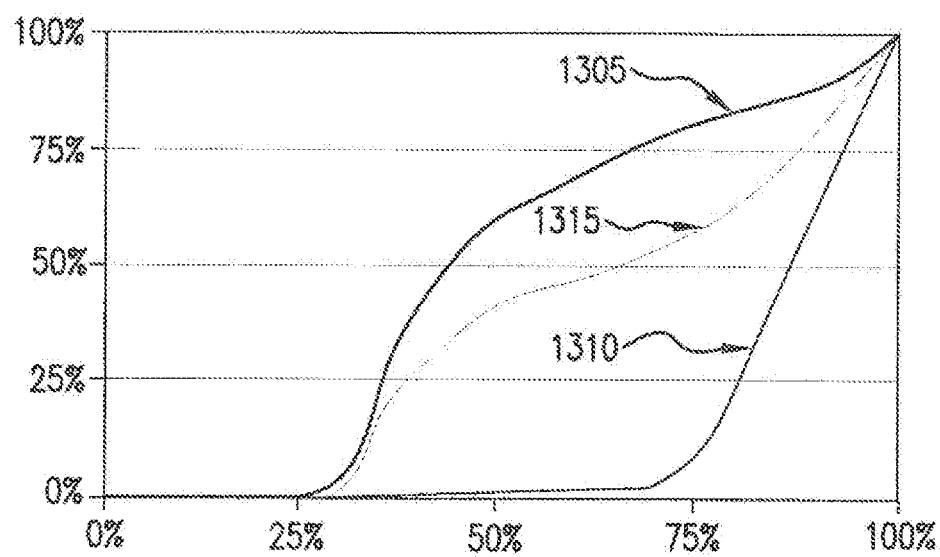

FIGS. 13A-13B illustrate exemplary plots 1300 of light output from the RUN 1305 and BYPASS 1310 LEDs, and their combined total output 1315, over a range of input voltage excitation.

FIG. 13A is a plot of exemplary light output in units of lumens for an example LED lamp with a circuit substantially similar to either of those of FIGS. 11A-11B. As the AC r.m.s. voltage is increased to about 45 volts, the RUN group of LEDs starts to conduct significant forward current and output light. The current from the RUN LEDs is diverted around the BYPASS group of LEDs until the AC input excitation is further increased to about 90 volts. As the voltage continues to increase, light from the BYPASS LEDs add to the light from the RUN LEDs, causing the total light output to exceed the light output from the RUN LEDs alone.

FIG. 13B depicts the plot of FIG. 13A in terms of normalized light output and percent of rated input excitation. In the depicted example, the total flux exhibits an inflection point at the point at which the BYPASS circuit begins to conduct current and output light.

As discussed above, suitable LEDs may be selected according to their color output to create a combined spectral output for the LED lamp assemblies 120. In one embodiment during the manufacturing process, in order to reduce bacteria in the facility, blue or red LEDs can be chosen while 620 nm-630 nm red light is not chosen thus eliminating an environmental stimulus for bacteria, instead leaving only the bacteria inhibiting blue light within the lighting device. Similarly, lighting elements, such as the light emitting diodes can be selected that have different wavelengths of red, such as 650 nm-660 nm red. In this manner the lighting element still has advantageous effects on the animal, but without enhancing the growth of dangerous bacteria.

While one way of eliminating the red or 620 nm-630 nm wavelength is to not choosing 620 nm-630 nm red lighting, another method is to use the SWC as previously discussed. Thus, a filter or dye can be placed on, or in front of a lens element or on an LED itself to block, alter or filter out 620 nm-630 nm red wavelength of light as taught in U.S. Ser. No. 13/452,332 to Grajcar and U.S. Ser. No. 13/050,910, now U.S. Pat. No. 8,596,804 that are incorporated in full herein. Again, by eliminating the exact 620 nm-630 nm wavelength, or the wavelength that maximizes bacteria growth, the optimum growing condition for bacteria is eliminated, providing a more bio-secure environment.

Thus provided are multiple ways to create a lighting device that eliminates lighting that promotes bacterial growth and promotes a bio-secure environment. Thus at the very least all of the problems discussed in the background have been addressed.

Although various embodiments have been described with reference to the figures, other embodiments are possible. For example, some embodiments of a composite source may produce a maximum light intensity at a wavelength that substantially corresponds to a maximum sensitivity of the diurnal avian's spectral sensitivity. In some examples, this may advantageously enhance an efficiency associated with visual response perception and electrical energy input consumption. In some further embodiments, the composite source may produce a second highest light intensity at a wavelength that substantially corresponds to a second highest sensitivity of the diurnal avian's spectral sensitivity. In some examples, this may advantageously further enhance the efficiency associated with visual response perception and electrical energy input consumption.

In some implementations, a facility similar to the facility 100 of FIG. 1, for example, may be used to grow livestock such as swine, cows, horses, goats, diurnal avians (e.g. chickens, turkeys), or the like. By way of example and not limitation, the lighting may be used to promote the development of chickens such as breeders, broilers, or layers, for example. In various embodiments, the lighting may be sourced by one or more LED lamps, each of which may output a color temperature that is a function of the AC excitation level supplied from the controller. For different types of livestock, the color shift may be different to optimize the light exposure for each type. For example, breeders may require some periods of infrared light to promote sexual activity. Optimal spectral profiles may be developed based on published research results or empirical data, and appropriate spectral profiles may be provided by appropriate selection of type, number and color of groups of LEDs, LED light engine architecture with bypass circuitry, and dimming control profile.

One study found that the three pigments in cones of a human eye may have local sensitivity maxima, for example, at about 419, 531, and 558 nm (Dartnall et al., 1983). The study further indicates that the four pigments in a chicken eye may have local sensitivity maxima, for example, at about 415, 455, 508, and 571 nm.

Various spectral components may be advantageous for birds at different stages of development. For example, research indicates that broiler chickens under blue or green light may become significantly heavier than similar chickens exposed to red or white light. (Rozenboim et al., 2004) Some research indicates that green light may accelerate muscle growth (Halevy et al., 1998) and may stimulate growth at an early age, whereas blue light may stimulate growth in older birds (Rozenboim et al., 999, 2004). Some studies have found that young broilers have a strong preference for bright light (Davis et al., 1997).

In some embodiments, materials selection and processing may be controlled to manipulate the LED color temperature and other light output parameters (e.g., intensity, direction) so as to provide LEDs that will produce a desired composite spectral output. Appropriate selection of LEDs to provide a desired color temperature, in combination with appropriate application and threshold determination for the bypass circuit, can advantageously permit tailoring of color temperature variation over a range of input excitation.

Some implementations may be controlled in response to signals from analog or digital components, which may be discrete, integrated, or a combination of each. Some embodiments may include programmed and/or programmable devices (e.g., PLAs, PLDs, ASICs, microcontroller, microprocessor, digital signal processor (DSP)), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

In some implementations, a computer program product may contain instructions that, when executed by a processor, cause the processor to adjust the color temperature and/or intensity of lighting, which may include LED lighting. Color temperature may be manipulated by a composite light apparatus that combines one or more LEDs of one or more color temperatures with one or more non-LED light sources, each having a unique color temperature and/or light output characteristic. By way of example and not limitation, multiple color temperature LEDs may be combined with one or more fluorescent, incandescent, halogen, and/or mercury lights sources to provide a desired color temperature characteristic over a range of excitation conditions.

In accordance with another embodiment, AC input excitation may be modified by other power processing circuitry. For example, a dimmer module that uses phase-control to delay turn on and/or interrupt current flow at selected points in each half cycle may be used. In some cases, harmonic improvement may still advantageously be achieved even when current is distorted by the dimmer module. Improved power factor may also be achieved where the rectified sinusoidal voltage waveform is amplitude modulated by a dimmer module, variable transformer, or rheostat, for example. In some embodiments, electrical input excitation may be substantially AC, DC (e.g., battery, rectifier, solar powered), or a combination thereof.

In one example, the excitation voltage may have a substantially sinusoidal waveform, such as line voltage at about 120 VAC at 50 or 60 Hz. In some examples, the excitation voltage may be a substantially sinusoidal waveform that has been processed by a dimming circuit, such as a phase-controlled switch that operates to delay turn on or to interrupt turn off at a selected phase in each half cycle. In some examples, the dimmer may modulate the amplitude of the AC sinusoidal voltage (e.g., AC-to-AC converter), or modulate an amplitude of the rectified sinusoidal waveform (e.g., DC-to-DC converter).

In some implementations, the amplitude of the excitation voltage may be modulated, for example, by controlled switching of transformer taps. In general, some combinations of taps may be associated with a number of different turns ratios. For example, solid state or mechanical relays may be used to select from among a number of available taps on the primary and/or secondary of a transformer so as to provide a turns ratio nearest to a desired AC excitation voltage.

In some examples, AC excitation amplitude may be dynamically adjusted by a variable transformer (e.g., variac) that can provide a smooth continuous adjustment of AC excitation voltage over an operating range. In some embodiments, AC excitation may be generated by a variable speed/voltage electro-mechanical generator (e.g., diesel powered). A generator may be operated with controlled speed and/or current parameters to supply a desired AC excitation to an LED-based light engine, such as the light engine of FIG. 1, for example. In some implementations, AC excitation to the light engine may be provided using well-known solid state and/or electro-mechanical methods that may combine AC-DC rectification, DC-DC conversion (e.g., buck-boost, boost, buck, flyback), DC-AC inversion (e.g., half- or full-bridge, transformer coupled), and/or direct AC-AC conversion. Solid state switching techniques may use, for example, resonant (e.g., quasi-resonant, resonant), zero-cross (e.g., zero-current, zero-voltage) switching techniques, alone or in combination with appropriate modulation strategies (e.g., pulse density, pulse width, pulse-skipping, demand, or the like).

This document discloses technology relating to light sources adapted to spectral sensitivities of diurnal avians. Related example implementations, techniques, or apparatus may be found in previously-filed disclosures that have common inventorship with this disclosure.

Examples of technology for dimming and color-shifting a light source with AC excitation are described with reference, for example, to the various figures of U.S. Provisional Patent Application entitled "Color Temperature Shift Control for Dimmable AC LED Lighting." Ser. No. 61/234,094, which was filed by Z. Grajcar on Aug. 14, 2009, the entire contents of which are incorporated herein by reference.

Examples of technology for improved power factor and reduced harmonic distortion for color-shifting a light source are described with reference, for example, at least to FIGS. 20A-20C of U.S. Provisional Patent Application entitled "Reduction of Harmonic Distortion for LED Loads," Ser. No. 61/233,829, which was filed by Z. Grajcar on Aug. 14, 2009, the entire contents of which are incorporated herein by reference.

Further embodiments of light engines for a lighting system are described with reference, for example, at least to FIGS. 1, 2, 5-5B, 7A-7B, and 10A-10B of U.S. Provisional Patent Application entitled "Architecture for High Power Factor and Low Harmonic Distortion LED Lighting," Ser. No. 61/255,491, which was filed by Z. Grajcar on Oct. 28, 2009, the entire contents of which are incorporated herein by reference.

Various embodiments may incorporate one or more electrical interfaces for making electrical connection from the lighting apparatus to an excitation source. An example of an electrical interface that may be used in some embodiments of a downlight is disclosed in further detail with reference, for example, at least to FIG. 1-3, or 5 of U.S. Design patent application entitled "Lamp Assembly," Ser. No. 29/342,578, which was filed by Z. Grajcar on Oct. 27, 2009, the entire contents of which are incorporated herein by reference.

Instead of a threaded screw-type interface, some embodiments may include a section of a track lighting-style receptacle to receive the dual post interface of an exemplary lamp. For example, a dual post electrical interface of the type used for GU 10 style lamps may be used. An example of an electrical interface that may be used in some embodiments of a downlight is disclosed in further detail with reference, for example, at least to FIG. 1, 2, 3, or 5 of U.S. Design patent application entitled "Lamp Assembly," Ser. No. 29/342,575, which was filed by Z. Grajcar on Oct. 27, 2009, the entire contents of which are incorporated herein by reference.

Some embodiments of a light apparatus may be integrated with packaging and/or thermal management hardware. Examples of thermal or other elements that may be advantageously integrated with the embodiments described herein are described with reference, for example, to FIG. 15 in U.S. Publ. Application 2009/0185373 A1, filed by Z. Grajcar on Nov. 19, 2008, the entire contents of which are incorporated herein by reference.

This document discloses technology relating to dimmable LED light engines adapted to spectral sensitivities of diurnal avians and humans. Related example implementations, techniques, or apparatus may be found in previously-filed disclosures that have common inventorship with this disclosure.

Various examples of apparatus and methods may relate to lighting for providing light energy at wavelengths that substantially correlate to peaks in the spectral sensitivity of the poultry. Examples of such apparatus and methods are described with reference, for example, at least to FIGS. 2A-2B of U.S. Provisional Patent Application entitled "Light Sources Adapted to Spectral Sensitivity of Diurnal Avians," Ser. No. 61/314,617, which was filed by Z. Grajcar on Mar. 17, 2010, the entire contents of which are incorporated herein by reference.

Various embodiments relate to dimmable lighting for livestock. Examples of such apparatus and methods are described with reference, for example, at least to FIGS. 3, 5A-6C of U.S. Provisional Patent Application entitled "LED Lighting for Livestock Development," Ser. No. 61/255,855, which was filed by Z. Grajcar on Oct. 29, 2009, the entire contents of which are incorporated herein by reference.

Examples of technology for dimming and color-shifting a light source with AC excitation are described with reference, for example, to the various figures of U.S. Provisional Patent Application entitled "Color Temperature Shift Control for Dimmable AC LED Lighting," Ser. No. 61/234,094, which was filed by Z. Grajcar on Aug. 14, 2009, the entire contents of which are incorporated herein by reference.

Examples of technology for improved power factor and reduced harmonic distortion for color-shifting a light source are described with reference, for example, at least to FIGS. 20A-20C of U.S. Provisional Patent Application entitled "Reduction of Harmonic Distortion for LED Loads," Ser. No. 61/233,829, which was filed by Z. Grajcar on Aug. 14, 2009, the entire contents of which are incorporated herein by reference.

Further embodiments of light engines for a lighting system are described with reference, for example, at least to FIGS. 1, 2, 5-5B, 7A-7B, and 10A-10B of U.S. Provisional Patent Application entitled "Architecture for High Power Factor and Low Harmonic Distortion LED Lighting," Ser. No. 61/255,491, which was filed by Z. Grajcar on Oct. 28, 2009, the entire contents of which are incorporated herein by reference.

Various embodiments may incorporate one or more electrical interfaces for making electrical connection from the lighting apparatus to an excitation source. An example of an electrical interface that may be used in some embodiments of a downlight is disclosed in further detail with reference, for example, at least to FIG. 1-3, or 5 of U.S. Design patent application entitled "Lamp Assembly," Ser. No. 29/342,578, which was filed by Z. Grajcar on Oct. 27, 2009, the entire contents of which are incorporated herein by reference.

Instead of a threaded screw-type interface, some embodiments may include a section of a track lighting-style receptacle to receive the dual post interface of an exemplary lamp. For example, a dual post electrical interface of the type used for GU 10 style lamps may be used. An example of an electrical interface that may be used in some embodiments of a downlight is disclosed in further detail with reference, for example, at least to FIG. 1, 2, 3, or 5 of U.S. Design patent application entitled "Lamp Assembly," Ser. No. 29/342,575, which was filed by Z. Grajcar on Oct. 27, 2009, the entire contents of which are incorporated herein by reference.

Some embodiments of a light apparatus may be integrated with packaging and/or thermal management hardware. Examples of thermal or other elements that may be advantageously integrated with the embodiments described herein are described with reference, for example, to FIG. 15 in U.S. Publ. Application 2009/0185373 A1, filed by Z. Grajcar on Nov. 19, 2008, the entire contents of which are incorporated herein by reference.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

The invention claimed is:

1. A method of illuminating diurnal avians in a substantially enclosed habitat with artificial light sources, the method comprising:
    supplying a first light having a first spectral content between 380 nm (nanometers) and 780 nm, the first light having a first local maximum in relative intensity at a first wavelength between 450 nm and 520 nm corresponding to a first local maximum of visual spectral sensitivity of the diurnal avian;
    supplying a second light having a second spectral content between 380 nm and 780 nm, the second light and having at least one local maximum in relative intensity at a second wavelength between 530 nm and 590 nm corresponding to a second local maximum of visual spectral sensitivity of the diurnal avian; and
    supplying a third light having a third spectral content below 400 nm corresponding to a third local maximum of spectral sensitivity of the diurnal avian.

2. The method of claim 1, further comprising:
    converting the first light to the second light.

3. The method of claim 1, further comprising:
    supplying a fourth light having a fourth spectral content between 380 nm and 780 nm, the fourth light having a fourth local maximum in relative intensity at a fourth wavelength within 30 nm of a fourth local maximum of visual spectral sensitivity of the diurnal avian.

4. The method of claim 3, wherein the at least one local maximum in relative intensity of the fourth spectral content is between 590 nm and 620 nm.

5. The method of claim 3, wherein the at least one local maximum in relative intensity of the fourth spectral content is between 630 nm and 680 nm.

6. The method of claim 1, wherein the first light is gradually dimmed leaving only the second light and the third light.

7. The method of claim 1, wherein the first light and the second light are gradually dimmed leaving only the third light.

8. The method of claim 1, wherein the first light, the second light, and the third light are sequentially provided to the diurnal avians.

9. The method of claim 1, wherein the first light and the second light are supplied by a composite source.

10. The method of claim 1, wherein the first light and the second light are supplied by a single LED.

11. The method of claim 10, wherein the third light is supplied by the single LED.

12. The method of claim 1, wherein the first light, the second light, and the third light are supplied by a composite source.

13. The method of claim 12, wherein the composite source includes a network of white LEDs, ultraviolet LEDs, and green LEDs.

14. The method of claim 12, wherein the composite source includes a network of green LEDs, ultraviolet LEDs, and blue LEDs.

* * * * *